(12) United States Patent
Bland

(10) Patent No.: US 12,392,261 B2
(45) Date of Patent: Aug. 19, 2025

(54) BLAND/EWING CYCLE IMPROVEMENTS

(71) Applicant: Joseph Barrett Bland, Sacramento, CA (US)

(72) Inventor: Joseph Barrett Bland, Sacramento, CA (US)

(*) Notice: Subject to any disclaimer, the term of this patent is extended or adjusted under 35 U.S.C. 154(b) by 0 days.

(21) Appl. No.: 17/746,848

(22) Filed: May 17, 2022

(65) Prior Publication Data

US 2024/0352875 A1    Oct. 24, 2024

Related U.S. Application Data

(60) Provisional application No. 63/189,634, filed on May 17, 2021.

(51) Int. Cl.
F01K 3/18 (2006.01)
C09K 5/04 (2006.01)

(52) U.S. Cl.
CPC ............ F01K 3/188 (2013.01); C09K 5/042 (2013.01); *C09K 2205/12* (2013.01)

(58) Field of Classification Search
CPC ...... F01K 3/188; C09K 5/042; C09K 2205/12
See application file for complete search history.

(56) References Cited

U.S. PATENT DOCUMENTS

| | | | |
|---|---|---|---|
| 3,067,594 A * | 12/1962 | Bland | F02K 9/64 60/260 |
| 3,198,710 A | 8/1965 | Long | |
| 3,225,538 A * | 12/1965 | Bland | F01K 3/188 60/649 |
| 3,263,414 A | 8/1966 | Herbst | |
| 3,273,332 A | 9/1966 | Poudrier | |
| 3,370,420 A | 2/1968 | Johnson | |
| 3,871,179 A * | 3/1975 | Bland | F02G 1/043 60/649 |
| 4,702,903 A | 10/1987 | Keefer | |
| 4,801,308 A | 1/1989 | Keefer | |
| 4,816,121 A | 3/1989 | Keefer | |
| 4,968,329 A | 11/1990 | Keefer | |
| 5,082,473 A | 1/1992 | Keefer | |
| 5,096,469 A | 3/1992 | Keefer | |
| 5,256,172 A | 10/1993 | Keefer | |
| 6,051,050 A | 4/2000 | Keefer et al. | |
| 6,357,217 B1 | 3/2002 | Griffin | |

(Continued)

OTHER PUBLICATIONS

Stochl, Robert J., Potential Performance Improvement Using A Reacting Gas (Nitrogen Tetroxide) As The Working Fluid In A Closed Brayton Cycle (Dec. 1979), retrieved from https://ntrs.nasa.gov/api/citations/19800008230/downloads/19800008230.pdf.

*Primary Examiner* — Shafiq Mian
(74) *Attorney, Agent, or Firm* — Womble Bond Dickinson (US) LLP

(57) ABSTRACT

The present application is directed towards a method for performing a closed thermochemical and thermodynamic (chemo/thermodynamic) work-producing cycle having improved efficiency, wherein the chemo/thermodynamic work-producing cycle includes a first work-producing half-cycle and a second heat-producing half-cycle, the first work-producing half-cycle includes an endothermic reaction, and the second heat-producing half-cycle includes an exothermic reaction.

18 Claims, 6 Drawing Sheets

(56) References Cited

U.S. PATENT DOCUMENTS

| | | | |
|---|---|---|---|
| 6,374,591 B1 * | 4/2002 | Johnson | F01K 23/10 60/785 |
| 7,028,481 B1 * | 4/2006 | Morrow | F02C 1/10 60/671 |
| 2011/0226447 A1 * | 9/2011 | Mieda | F28D 20/003 165/104.12 |
| 2014/0202147 A1 | 7/2014 | Woodsum | |
| 2022/0119328 A1 * | 4/2022 | Schroer | C01B 3/342 |

* cited by examiner

BLAND/EWING CYCLE IMPROVEMENTS

CROSS-REFERENCE TO RELATED APPLICATIONS

This application claims the benefit of provisional patent application EFS ID 42745216, Application No. 63/189,634, filed 17 May 2021 by the present inventor, which is incorporated by reference in its entirety.

PRIOR ART

This field is related to reversible thermochemical and thermodynamic (chemo/thermodynamic) cycles based on U.S. Pat. Nos. 3,067,594, 3,225,538, and 3,871,179.

BACKGROUND

U.S. Pat. No. 3,067,594, filed May 11, 1959 and granted to Reginald B. Bland and Frederick J. Ewing on Dec. 11, 1962 and U.S. Pat. No. 3,225,538, filed Mar. 25, 1960, granted to Reginald B. Bland and Frederick J. Ewing on Dec. 28, 1965, disclosed Bland and Ewing's seminal invention of, respectively, chemo/thermodynamic open cycles and chemo/thermodynamic closed and semi-closed cycles, referred to herein as Bland/Ewing (B/E) cycles. When applied specifically to heat engine cycles, B/E cycles shall be referred to as B/E heat engine cycles.

Heat engines are defined as work-generating devices that operate as a result of a temperature difference in their working fluid. The Carnot theorem for maximum theoretical efficiency of a heat engine, mathematically expressed by the equation $(Th-Tc)/Th$, where $Th$ is the absolute temperature of the hot reservoir or heat source and $Tc$ is the absolute temperature of the cold reservoir or heat sink, specifies limits on the maximum theoretical thermal efficiency that any heat engine can obtain.

a. A B/E heat engine cycle does not materially change theoretical thermal efficiency; that is, a heat engine with a given $Th$ and $Tc$ still has the same maximum theoretical efficiency. However, in real world engines, various unavoidable losses, for example friction losses, resistance to pumping losses, radiation losses, and so forth, impact the delivered thermal efficiency, often referred to in the form of net work out divided by total source heat in.
  b. A B/E heat engine cycle, by changing the "endothermic fluid" (product) mol count for the expander to be higher than the "exothermic fluid" (reactant) mol count for the compressor, reduces the work put in by the compressor relative to the work put out by from the expander, known as the heat engine's mechanical efficiency. Since the compressor is usually the biggest part of the engine, that decreases many of the unavoidable losses in heat engines, allowing the delivered thermal efficiency of said heat engines to more closely approach the theoretical efficiency.

The B/E heat engine cycle invention was part of a more general thermochemical technology invented by Bland and Ewing and submitted to the US Patent and Trademark Office in the late 1950's and early 1960's, covering several basic thermochemical embodiments:

a. Efficiently producing net work out via open chemo/thermodynamic heat engine cycles;
  b. efficiently producing net work out via closed and semi-closed chemo/thermodynamic heat engine cycles;
  c. the use of reversible and hence potentially cyclical thermochemical reactions for storing and/or transporting endothermically-absorbed heat;
  d. endothermic cooling of materials and processes at set temperatures and pressures, and
  e. refrigeration by cooling of pressurized endothermic gaseous and/or vaporous products of endothermic reactions prior to expansion.

U.S. Pat. No. 3,067,594 covered chemo/thermodynamic heat engine open cycles and thermochemical cooling of open cycle heat engines. U.S. Pat. No. 3,225,538 covered closed and semi-closed chemo/thermodynamic heat engine cycles, cooling of closed cycle heat engines, and thermochemical storage and transfer of heat. A third B/E cycle patent was submitted to the US Patent and Trademarks Office in the late 1950's covering endothermic cooling of materials and processes at set temperatures and pressures but came under an interference action that saw the proposed B/E third patent ultimately ruled against in favor of U.S. Pat. No. 3,198,710, filed Nov. 12, 1958 and issued on Aug. 3, 1965 to Robert B. Long, assignor to Esso Research and Engineering Company. The Long patent covered only endothermic cooling of atomic reactors, which had also been claimed within the larger B/E technology. A later patent, U.S. Pat. No. 3,871,179, granted posthumously to Reginald B. Bland, applied the chemo/thermodynamic heat engine cycle concept to the classic Stirling cycle. Finally, there exists a fourth relevant patent, U.S. Pat. No. 3,370,420, filed On Oct. 19, 1965, issued to Kenneth P. Johnson, which covered a special case of chemo/thermodynamic cycle and some of its embodiments. The relevance to U.S. Pat. No. 3,370,420 will be discussed below under the subheading "B/E-L Cycle: Pump Pressurization of Non-Gaseous Reactants".

From U.S. Pat. No. 3,225,538, column 7, paragraph 3, line 27: "Reactions in which the number of moles of endothermic fluid is greater than that of the exothermic fluid are preferred because the amount of work obtainable from the endothermic fluid is directly proportional to the number of moles. Hence, it is desirable to have a large number [of] moles in the endothermic fluid for performing the work of the engine, and contrary-wise, it is desirable to minimize the number of moles in the exothermic fluid prior to compressing the exothermic fluid." That is, decreasing the working fluid mol count of a gaseous working fluid compressor relative to the gaseous working fluid mol count of its expander will increase what is known as the "mechanical efficiency" of the heat engine. Mechanical efficiency is defined as the physical power put into a mechanism relative to the physical power taken out of the mechanism, and can be seen as potentially increasing the delivered thermal efficiency, as defined above. In essence, chemo/thermodynamic heat engine cycles use molecular compression and/or molecular expansion to increase the mechanical efficiency and thus the delivered thermal efficiency of said heat engine cycles.

In the particular B/E chemo/thermodynamic closed cycle instance described in U.S. Pat. No. 3,225,538, the reversible reaction $C6H12 <=> C6H6+3H2$ (1 mol of cyclohexane converted to or from 1 mol of benzene plus 3 moles of hydrogen) is used. $C6H12$ is therein defined as the exothermic fluid (hereinafter termed reactant/reactant mix) because it is formed with an exothermic liberation of chemically-produced heat, and $C6H6+H2$ is defined as the endothermic fluid (hereinafter termed product/product mix) because the $C6H6+3H2$, in its endothermic transformation from $C6H12$, chemically absorbs all the heat that will later be chemically released.

In the particular B/E chemo/thermodynamic heat engine cycle instance used for descriptive purposes in U.S. Pat. No. 3,225,538, application was proposed to modification of a standard Brayton cycle. A comparison of the two cycles is shown in FIG. 3 of U.S. Pat. No. 3,225,538 (illustrating standard Pressure/Volume or PV curves), and FIG. 4 (illustrating standard Temperature/Entropy or TS curves).

As shown in U.S. Pat. Nos. 3,067,594 and 3,225,538, the underlying B/E cycle foundational invention takes the form of a heat transfer system in which an endothermic chemical reaction and an exothermic chemical reaction are utilized in an open, closed, or semi-closed cycle for transferring heat from a region of higher temperature to a region of lower temperature. In one aspect, the heat transfer method or system of this foundational invention may take the form of a method or system for the production of mechanical work, or it may be embodied as a refrigeration system whereby some work is generated after cooling to a lower temperature. In another aspect, it may be adapted to heat a space, process, or substance. In a third aspect, it may be adapted to cool a space, process, or substance. Said methods or systems may be specifically or generally cyclical, for example where a chemical substance/reactant endothermically reacts to form products, the products are expanded producing work and are then reacted to re-form the initial chemical substance/reactant. It is also contemplated that a chemical substance/reactant which will undergo an endothermic chemical reaction may be employed to do mechanical work in a method which does not involve converting the reaction products back to the initial chemical substance/reactant, for example, where some or all of the product or products is used as a fuel. It is also contemplated that said endothermic and/or exothermic reactions can sometimes be encouraged to happen more quickly, as by passing the reactants through a catalyst and/or by substantially raising the substance's temperature at a given pressure.

Stated broadly, the underlying B/E cycle foundational invention utilizes control of changes in enthalpy and concomitant entropy in substances undergoing reversible exothermic-endothermic chemical reactions and conversion of such changes in enthalpy and entropy to sensible energy, as for heating a space or for driving an engine. The energy changes, which are controlled and utilized according to this foundational invention, result at least in part from changes in the chemical composition of the substances involved. Thus, this foundational invention utilizes a different dimension for production and control of sensible energy. This different dimension of control, i.e., change of composition, is one which may be superimposed on the basic controls of temperature, pressure, volume, and changes of phase for deriving sensible energy.

The term "reactant" as used in this specification and in the claims, means a substance, consisting of one or more elements and/or compounds, in liquid and/or vapor phases, which is formed with liberation of heat (negative heat of reaction) as a result of an exothermic reaction. The term "product" means a substance consisting of one or more elements and/or compounds, in liquid and/or vapor phases, which is formed with absorption of heat (positive heat of reaction) as a result of an endothermic reaction. The reactant absorbs heat in being converted to a product in an endothermic reaction. The product liberates heat in being converted to a reactant in an exothermic reaction.

The foundational method of the B/E invention comprises passing an amount of a chemical substance, which is adapted to under go an endothermic reaction of a reversible chemical reaction, into an endothermic reaction chamber, then subjecting the contents of the chamber to a constraint which will cause the rate of the endothermic reaction to exceed that of the reverse exothermic reaction of said reversible chemical reaction, with the result that a substantial amount of the reactant is converted to product, the product thereby acquiring an increase in enthalpy and entropy. The foundational invention further includes a method in which the product, substantially exhausted of its energy for example by expansion in an heat engine expander and/or exchange of heat with some process benefitting from said heat, is passed in a cyclical system at some later time and/or distance, to an exothermic-reaction chamber, then subjecting the product to a constraint which will cause the rate of the exothermic reaction to exceed that of the reverse endothermic reaction of said reversible chemical reaction, wherein the product is reconverted back to said reactant, while simultaneously delivering at least a substantial part of the endothermically-absorbed energy content of the product as sensible energy as, for example, for heating a space or for driving an engine. Finally the foundational invention includes the potential of a subsequent return of said reconverted reactant to said endothermic reaction chamber, and so on cyclically.

The B/E chemo/thermodynamic cycle is capable of being improved. One major improvement disclosed in U.S. Pat. Nos. 3,067,594, 3,225,538, and 3,871,179 is the use of a catalyst to speed up the thermochemical reaction speed. From U.S. Pat. No. 3,225,538, column 4, last paragraph, beginning at line 51 and ending at column 5, line 10: "It is to be understood that the equilibrium constant is applicable only when equilibrium conditions are reached. The actual degree of completion of either the endothermic reaction or the exothermic reaction may be less than that calculable from the equilibrium constant if, in fact, the time interval within which the reaction is carried out is less than that required for attainment of equilibrium. Consistent with the considerations set forth below, any means for increasing the rate of reaction is useful in increasing the actual degree of completion within a given time interval . . . . For either the endothermic reaction or the exothermic reaction, the rate of reaction will be increased through the use of a catalyst. Accordingly, the exothermic-endothermic reactions employed in the practice of this invention are preferably carried out over suitable catalysts."

It is herein proposed and understood that, while the B/E heat engine cycle is specifically concerned with improving the usefulness of work production by mechanical devices that operate between a temperature source and a temperature sink, B/E heat engine cycles can also indirectly improve various other embodiments by employing reversible chemical reactions of the exothermic-endothermic type. For example, the reversible thermochemical process for cooling atomic reactors, as disclosed in U.S. Pat. No. 3,198,710, may be improved in usefulness by operating said thermochemical cooling cycles in combination with B/E heat engine cycles. For a second example, the endothermic reaction product could serve as feedstock to a fuel cell that converts the product back into the reactant. That is, the main design function of this embodiment of a reversible thermochemical cycle, maintaining a temperature in atomic reactors, can be accomplished at the same time that a B/E heat engine cycle converts some of the heat thus captured into useful net work, energy, and/or heat. In addition, it is herein proposed and understood that the endothermically-captured waste heat in the product can be made available at a later time and/or distance for many other uses.

Various new embodiments of B/E cycles are proposed herein:
In a new embodiment of the foundational Bland/Ewing (B/E) chemo/thermodynamic cycle termed a B/E Liquid cycle (B/E-L), pump-pressurizing of non-gaseous reactant/reactants is proposed.
In a second new embodiment, a portion of the B/E cycle's non-gaseous and/or gaseous product/product mix's exothermic reaction, that is, the cycle's otherwise-waste exothermic heat, is used as the heat source for vaporizing and/or preheating non-gaseous and/or gaseous reactant/reactant mix and/or assisting in preheating said non-gaseous and/or gaseous product/product mix or a portion of said product/product mix.
In a third new embodiment of the B/E cycle, termed a B/E Combined cycle (B/E-C), a high temperature heat engine cycle powers a lower temperature B/E cycle with the high temperature waste heat of the high temperature heat engine cycle.
In a fourth new embodiment, ducted/valved regeneration is proposed as a means of increasing the efficiency of heat transfer for B/E cycles.

B/E-L Cycle: Pump Pressurization of Non-Gaseous Reactants

Proposed herein is a new B/E cycle termed a Bland/Ewing Liquid cycle (B/E-L cycle) that potentially increases a B/E cycle's mechanical efficiency by replacing gaseous compression with non-gaseous pump pressurization.

Many reactants or portions of reactants may be made liquid or solid, reducing the cost of storage and transportation. In the case of the reversible reaction C6H12<=>C6H6+3H2, both C6H12 and C6H6 are liquid at STP. Accordingly, they may be easily pump-pressurized to the required pressure for conversion prior to being vaporized and preheated.

As mentioned earlier, on Feb. 27, 1968, U.S. Pat. No. 3,370,420 was issued to Kenneth P. Johnson. In the Johnson patent, which did not reference either of the two earlier B/E patents, a type of B/E chemo/thermodynamic cycle is described. The basic reaction driving the Johnson embodiment is in fact mentioned in U.S. Pat. No. 3,225,538; that is, the reversible N2O4<=>2NO2 reaction, although in the Johnson embodiment, the cycle is enhanced by a further B/E dissociation/re-association cycle, namely the reversible 2NO2<=>NO+O2 cycle, creating the combined chemo/thermodynamic cycle N2O4<=>2NO2<=>NO+O2.

Importantly to the B/E-L cycle concept, a second embodiment in the Johnson patent claimed a type of chemo/thermodynamic cycle "Rankine cycle". From U.S. Pat. No. 3,370,420: "It is thus apparent that the N2O4 Rankine cycles are on an efficiency par with the conventional steam Rankine cycle. It is equally evident that the N2O4 cycle can produce the same efficiency at a pressure less than half that required for a steam [cycle] since a supercritical steam plant is operated at 3500 p.s.i.a. to achieve similar performance. in addition, feedwater heating is eliminated by use of the recuperator and the leakage of non-condensable into the system is avoided because the [N2O4] system condenses above ambient pressure."

An analysis of the Johnson patent's proposed N2O4<=>2NO2<=>NO+O2 chemo/thermodynamic cycle, including the Johnson chemo/thermodynamic Rankine cycle, will show it is strictly temperature/pressure-driven, with no mention of using a catalyst. Note, however, that it is very clearly stated in U.S. Pat. Nos. 3,067,594 and 3,225,538 that a catalyst is not strictly necessary to promote reversible thermochemical reactions. Thus, non-catalytic-driven chemo/thermodynamic cycles are still B/E cycles.

Importantly, in the Johnson temperature/pressure-driven cycle the exothermic reactions of both of the endothermic working fluids (2NO2<=NO+O2 and N2O4<=2NO2) exhausting from the expander are made to flow through a single non-catalytic recuperator. A sufficiently in-depth analysis of the chemo/thermodynamics of that process will conclude that using such a single non-catalytic recuperator is absolutely essential for the Johnson B/E cycle to function in an advantageous manner. That is because the only source of thermochemical energy possible to drive the N2O4=>2NO2 endothermic reaction is the 2NO2<=NO+O2 exothermic reaction, as will be shown.

The Johnson chemo/thermodynamic cycle disclosed in U.S. Pat. No. 3,370,420, was the subject of NASA Report TM-79322 (DOE/NASA/1060-79/3), titled "Potential performance improvement by using a reacting gas (nitrogen tetroxide) as the working fluid in a closed Brayton cycle". In NASA Report TM-79322, page 4, first paragraph: "The first stage of the dissociation (N2O4<=>2NO2) occurs mainly over the temperature range 70 [deg F.] to 340 deg F. The second stage (2NO2<=>2NO+O2) is significant in the temperature range 280 [deg F.] to 1600 deg F."

In addition, speed of reaction is a major issue, as is made clear in NASA Report TM-79322. Page 6, paragraph 1: "The second stage (2NO2<=>2NO+O2), for all practical purposes, does not begin until after a residence time of 2.0 seconds at 1000 deg F." Page 6, paragraph 2: "At 5 atmospheres, the second stage of the reaction is approximately 50 percent complete at the end of 2.0 seconds, while, at 20 atmospheres, the second stage is approximately 90 percent complete at the end of 2.0 seconds . . . . From these results, it is evident that the validity of the performance values based on the equilibrium assumption is strongly dependent notably on temperature but also on pressure."

Throughout NASA Report TM-79322 it is made clear that the completeness and/or speed of a non-catalyzed reaction is temperature-driven. That is, the reaction is less complete and slower at a lower temperature for a given pressure and more complete and faster at a higher temperature for that same pressure. Likewise, the relative pressures of the reactants and the products impacts completeness and/or speed of reaction. As a result, when the product is exhausted from the turbine at lower pressure than it entered the turbine, a purely temperature-driven exothermic reaction speed slows down and completes less.

Since the B/E heat engine cycles propose catalytic reactions that are practically instantaneous (which results in the seeming paradox of a change in volume at both constant pressure and constant temperature due to molecular expansion and contraction), they do not share the same limitations, although, as shown in U.S. Pat. No. 3,225,538, FIG. 1 and FIG. 2, the completeness of an instantaneous reaction is set by the reaction's pressure and temperature.

Therefore, looked at as separate endothermic and exothermic reactions, the overall reversible bi-thermochemical cycle N2O4<=>2NO2<=>NO+O2 is seen as a combination wherein the endothermic heats of the N2O4=>2NO2 and 2NO2=>NO+O2 reactions cannot be supplied by their respective N2O4<=2NO2 and the 2NO2<=NO+O2 reactions. Rather, the only exothermic reaction that can supply heat to a following endothermic reaction in the special case non-catalytic chemo/thermodynamic cycles proposed in U.S. Pat. No. 3,370,420 is the 2NO2<=NO+O2 reaction supplying heat to the N2O4=>2NO2 reaction.

This fundamental inability for thermochemical processes to provide their heat of endothermy by their own exothermic reaction was clearly recognized by Bland and Ewing, along with the time limitations for non-catalytic conversions, hence the clear separation between the B/E heat engine cycle endothermic process and the exothermic process and the application of catalysts to greatly speed up both processes.

There is one other built-in limitation to the non-catalytic chemo/thermodynamic cycle proposed in U.S. Pat. No. 3,370,420: As much as possible, all product is converted back to reactant at the end of each cycle. This is similar to the classic B/E/Brayton cycle disclosed in U.S. Pat. No. 3,225,538, FIG. 1 and FIG. 2, but is quite different from the B/E-L cycle proposed herein, where the unconverted product is proposed to be removed completely from the B/E heat engine each cycle. And it is this capability which allows the B/E-L cycle to overcome one limitation that is shared by both the standard B/E cycle Brayton closed cycle proposed in US Patent No. U.S. Pat. No. 3,225,538 and the special case chemo/thermodynamic Brayton cycle disclosed in U.S. Pat. No. 3,370,420: In both patents, continuous-pass cycles are proposed that continually recirculate a small quantity of thermochemical working fluid. On the other hand, a B/E-L cycle allows creation of a single-pass cycle system. In a single pass system, a fresh quantity of reactant/reactant mix is continually taken from an initial storage system, made to pass through the heat engine, then stored as a product/product mix in a second storage system. That reactant can then be either stored separately, as for separation out non-converted reactant, or simply returned to the reactant/reactant mix storage tank. Further, a portion of the stored product/product mix may be converted back into reactant to improve the thermal efficiency of the B/E-L engine producing said product/product mix. The engine will thus essentially consume reactant and exhaust and store product as long as there is a supply of reactant. Note that the stored product can then be pumped and/or compressed to a desired pressure, fed into a counter-flow heat exchanger heated by converted reactant flowing back out of an exothermic reactor, passed through said reactor to produce the stored heat, and then stored in a reactant storage system, thus acting as a completely autonomous system that can be activated at a distant time or place.

A single-pass system has several other non-obvious benefits:
(1) It can be arranged that there are no impurities in the reactant/reactants or products/product mixes. That is, downstream processes can ensure that pure reactant/reactant mixes and pure product/product mixes can be used in their relevant chemo/thermodynamic cycles.
(2) The endothermic and/or exothermic processes can be taken as close to completion as possible, increasing the processes' mechanical efficiencies.
(3) Any non-gaseous components of the product/product mix can be liquified following the cycle, making those components easy to separate from any gaseous components and easy to store, possibly even in the same storage tanks.
(4) Any non-gaseous components, for example a mix of C6H12 and C6H6, can be separated from one another by an external separation process, such as using centrifuges, creating a temporary state-change between the components, a combination of both, and so forth.
(5) By moving from constant product recycling to storable quantities of product, any impurities that are generated can be dealt with at environmentally safe sites designed for the purification process.
(6) A B/E-L cycle or B/E-L heat engine cycle creates a means for storing and distributing work, chemical energy, and heat, tailorable to the requirement for each. Assuming the product/product portion can be stabilized at a storable temperature and pressure, the product/product portion can be transported to wherever it can be made useful, or to wherever it can find a source of a component that allows it to converted back into the original reactant. Exothermic fluid/partial exothermic fluid can thus be manufactured at one point and be utilized and converted to endothermic fluid/partial endothermic fluid at another, and vise versa.

Other examples of advantages that accrue to a B/E-L cycle or B/E-L heat engine cycle if the reactant is not gaseous and may therefore be pump-pressurized:
(1) Pump-pressurizing a non-gaseous reactant or portion of reactant decreases the work of compression and thus increases the mechanical efficiency of a heat engine.
(2) Using a B/E-L cycle permits more exothermic heat to be recycled into said cycle's reactant, as for supplying change of state heat and both non-gaseous and gaseous latent heat, up to the temperature of the exothermic reaction, following which latent heat in the product/product mix may also be used, increasing theoretical thermal efficiency.
(3) Otherwise-waste heat can be added to the liquid reactant/reactant mix and/or product/product mix, starting from the temperature of storage, thus increasing theoretical thermal efficiency. For example, in a Permanently Shadowed Region (PSR) on the lunar surface, where temperatures can be as low as 100 deg K. (−173 deg C., −280 deg F.), since the efficiency of a heat engine depends in part on the temperature of the sink, reducing the temperature at which otherwise-waste heat can be added could significantly increase theoretical thermal efficiency.
(4) B/E heat engine cycles can be integrated directly into present B/E cycle-based Chemical Heat Pipe (ChemHP) efforts, creating additional benefits. The foundational basis of the ChemHP concept was disclosed in U.S. Pat. No. 3,225,538, FIG. 5, for example in claim 1 and claim 3. An example of various repetitive thermochemical closed cycles under active consideration is illustrated by the U.S. Department of Energy Office of Scientific and Technical Information (OSTI) technical report from Feb. 1, 1978, OSTI ID No. 6524508, entitled "Closed loop chemical systems for energy storage and transmission (chemical heat pipe), Final report".

B/E Heat Engine Cycle Exothermic Waste Heat Recycling

With B/E cycles, unused waste heat can be stored indefinitely and shipped to where it can best be used. The usefulness of endothermically-stored heat for many purposes is well recognized in U.S. Pat. Nos. 3,067,594 and 3,225,538. It is proposed herein that a portion of that endothermically-stored heat be used to improve the thermal efficiency of a B/E cycle.

One well known technique for exchanging heat between two countercurrent fluid streams is the use of a counterflow heat exchanger mechanism, sometimes called a recuperator. In a recuperator, manifolds exchange heat across a common wall or walls, thus simultaneously heating the inflowing reactants while cooling the outflowing products. Note that this is normally done at a constant pressure in the two fluid streams, but that the two fluid streams don't necessarily need to share the same pressure, although the common wall/walls must be thicker the higher the pressure difference, and the thicker the wall/walls separating the two streams, the less easily/efficiently heat is conducted across the walls.

In the combined chemo/thermodynamic B/E cycle disclosed in U.S. Pat. No. 3,370,420, FIG. 19 through FIG. 22, the cycle is shown indirectly receiving exothermic energy via a "recuperator". In the single-cycle chemo/thermodynamic B/E cycle disclosed in U.S. Pat. No. 3,225,538, FIG. 8, a recuperator termed a "heat exchanger" is also shown as reference numeral 64. However, in U.S. Pat. No. 3,225,538, FIG. 8, no exothermic heat is being received. That can be seen since, in U.S. Pat. No. 3,225,538, FIG. 8, fluid being received from a compressor (the pump being of necessity a compressor since it is receiving a gaseous working fluid from the exothermic reactor) is being heated, not by the exothermic reactor, which is activated prior to the compression, but by the product exiting the expander. On the other hand, in U.S. Pat. No. 3,370,420, FIG. 19 through FIG. 22, the heat, including latent heat and exothermic heat, of the product/product mix exiting the expander is being recuperated into a gas that has not yet been passed through either a pump or a compressor.

In a standard B/E cycle with a single thermochemical cycle, as stated above, the exothermic waste heat is not usable to power the preceding endothermic reaction. However, a portion of that single cycle's exothermic waste heat is still indirectly useful to a B/E-L cycle, as has been shown above under "B/E-L cycle: Pump Pressurization of non-gaseous reactants". That is, with B/E-L cycles, a portion of the endothermically-stored heat may be used to provided heat energy back to a cycle, for example by converting a non-gaseous working fluid to a gaseous working fluid.

However, while the advantage of reusing exothermic heat in the conversion of non-gaseous to gaseous reactants also potentially accrues to the Johnson chemo/thermodynamic steam cycle, they must be quickly taken advantage of "on the fly" as the various products are cooled and immediately begins converting into reactants. The NO+O2 product mix in particular begins converting into 2NO2 reactant directly after coming out of the expander. And while, as will be shown, the N2O4<=2NO2 exothermic reaction must occur at too low a temperature to supply any meaningful heat to the N2O4=>2NO2 endothermic reaction it can yield its exothermic heat to the conversion of non-gaseous to gaseous reactants, it also must be done "on the fly". Thus, in all cases shown in U.S. Pat. No. 3,370,420, FIG. 19 through FIG. 22, a single recuperator following expansion is shown for recuperating (a) latent heat of the working fluid exiting the expander, (b) heat of the 2NO2<=NO+O2 exothermic reaction, and (c) heat of the N2O4<=2NO2 exothermic reaction.

In the embodiment proposed herein, the recuperator does not following the expander, but is a separate element fueled by previously converted and largely stored product/product mix.

B/E Combined Cycle Heat Engine (B/E-C)

In a B/E-C, waste heat from a high temperature heat source, such as a high temperature B/E cycle's exothermic reaction, can be used to supply the heat to a lower pressure and/or temperature B/E cycle's endothermic reaction.

Something similar occurs in U.S. Pat. No. 3,370,420 Johnson chemo/thermodynamic cycle, since it involve at least two reaction phases, the first being N2O4<=>2NO2 and the second being 2NO2<=>NO+O2. However, there was no proposal within the Johnson patent to use catalytic reactions. Therefore, the endothermic and exothermic temperatures/pressures are hard to map, and it is not obvious that the needs of the two thermochemical processes don't perfectly match. In addition, by relying completely on increases and decreases in temperature at a given pressure or pressures, the Johnson chemo/thermodynamic system requires sufficient time to pass for the reactions to proceed to completion, where with a catalytic system, reactions are for all intents and purposes instantaneous NASA Report TM-79322, mentioned above, references U.S. Pat. No. 3,370,420, and can be considered a more detailed examination of the Johnson N2O4<=>2NO2<=>N2+O2 dissociating/re-associating Brayton combined cycle. However, the NASA analysis itself is also theoretical, and, as in the Johnson patent, overlooks a serious thermal mismatch within the single recuperator between the compressor exhaust and the expander exhaust. This overlooked mismatch appears to be the result of modeling a single thermal recuperator for the exothermic heat of both the 2NO2<=NO+O2 reaction and the N2O4<=2NO2 reaction, and not specifically calculating the two different exothermic outputs and the two different required endothermic inputs. When calculating the two chemo/thermodynamic processes separately, it becomes apparent that the exhausting N2+O2 stream, being at a substantially lower pressure than the inflowing 2NO2 stream, cannot possibly drive the 2NO2=>N2+O2 reaction to completion, since the temperature and pressure exiting the expander drops too low to supply much if any thermal energy to the dissociating 2NO2. As a result, only the higher temperature thermal energy of 2NO2<=N2+O2 exothermic re-association can power the low temperature N2O4=>2NO2 endothermic dissociation, and much if not all of the N2O4<=2NO2 reaction must be occurring in the cooler, where it is completely thrown away. This will seriously impact the overall thermal efficiency of the process.

This raises a very important aspect of the B/E cycle in general. By its nature, it must make use of the product's captured waste heat to be efficient. This is accomplished in part in the Johnson approach, which, as shown below, can recapture about a third of the total thermochemical waste heat in the combined 2NO2<=N2+O2 and N2O4<=2NO2 products conversions in the following N2O4=>2NO2 endothermic reaction, and a bit more if the various exothermic reactions and latent waste heats are used to power the conversion of non-gaseous to gaseous reactants.

Thus, while in no case can a low pressure N2O4<=2NO2 reaction power a higher pressure N2O4=>2NO2 reaction, the N2O4<=2NO2 reaction can supply heat for preheating and vaporizing non-gaseous N2O4, as can any remnant heat from the 2NO2<=N2+O2 reaction. However, the 2NO2<=N2+O2 exothermic energy is not easily stored, since to "freeze" the reaction as N2+O2 product, either the fluid would have to be stored as gas at high temperatures to avoid reconversion to 2NO2, or the two gases would have to somehow be economically separated at said high temperature. The same is true of the N2O4<=2NO2 reaction, although the required storage temperature would be significantly lower.

It is possible to get a rough estimate of how efficient the chemo/thermodynamic N2O4<=>2NO2<=>N2+O2 non-steam cycle might be. From NASA Report TM-79322, FIG. 1, the total endothermic heat required for the N2O4=>2NO2 reaction equals 268 Btu/lbm, while the total endothermic heat required for the 2NO2<=N2+O2 reaction equals 529 Btu/lbm. That means that, at best, only about ⅓ of the total heat absorbed endothermically in both reactions is potentially available to feed the N2O4=>2NO2 reaction, and about ⅔ is therefore thermochemical waste heat.

Per NASA Report TM-79322, FIG. 5, 100.0 units of source energy are added to 345.6 Units leaving the high pressure (product) side of the recuperator, sending 445.6 Units into the expansion turbine. Turbine output equals 43.0

Units and 390.2 Units of energy are left in the low pressure turbine exhaust and sent through the low pressure side of the recuperator. Exhausting from the other side of the recuperator is 100.6 Units and 289.6 Units of otherwise-waste energy are shown having successfully transferred from the product to the reactant. Of the remaining 100.6 Units exhausting into the pre-cooler, 57 Units are removed there, leaving 43.6 Units to be passed into the compressor. Since 56 Units are shown exiting the compressor, 12.4 Units of heat/work are added by the compressor, leaving a net work out of 30.6 Units. (However, it also states, on page 5, paragraph 3: "For this particular comparison, only 22.4 percent of the turbine output is required for compression with N2O4 . . . ". That would equal 9.6 Units of compressor work, leaving a net work out of 33.4 Units.) Measured by net work out/source energy in, maximum theoretical thermal efficiency therefore equals between 30.6/100 and 33.4/100.

However, as noted, this schematic and the calculations derived from it do not separate the two chemo/thermodynamic cycles, which is unfortunate. Using the previous calculation that showed only ⅓ of the endothermic requirements were actually met, the amount of heat that would actually be removed via the pre-cooler would likely at least double, which means the required source heat would need to double. Measured by net work out divided by double the source energy in, maximum theoretical efficiency could drop to 33.4/200 or 16.7% or less. Even with the higher mechanical efficiency of a B/E cycle, delivered thermal efficiency will be appreciably under that.

However, in a B/E-C cycle, the ability exists to use otherwise-waste exothermic heat for other useful purposes. That is, in the proposed B/E-C cycle, the product may be stored and/or transported for use at a distant time and/or place. For example, the stored thermochemical heat could be used to increase the efficiency of a secondary B/E-L heat engine cycle. Thus, for example, the thermal energy required to drive a N2O4=>2NO2 cycle or possibly even a N2O4<=>2NO2<=>N2+O2 cycle could theoretically be supplied by a C6H12<=C6H6+3H2 exothermic reaction.

Ducted/Valved Regeneration

It is possible to capture exothermic waste heat in a recuperator, as mentioned above. However, there is an alternative to recuperation called regeneration. In regeneration, heat is exchanged between two countercurrent streams through the use of a common thermal storage material that is a good thermal conductor. It is proposed herein that a special kind of regenerator, called a ducted and/or valved regenerator, be used for B/E heat engine cycles rather than a recuperator.

Presently, thermal regeneration within heat engines uses a very simple single regenerator. In such a regenerator, a working fluid (gas, vapor, liquid, or some combination thereof) passes back and forth through a plenum, usually packed with very fine wires that allow the working fluid to easily pass through and simultaneously allow the thermal energy in the working fluid to easily store or release heat to or from the working fluid. Stirling engines that use this mechanism continually cycle the same working fluid stream back and forth through a single regenerator.

One type of regenerator is a ducted or valved regenerator. A particular regenerator embodiment creates a kind of "valved switching regenerator" (VSR), where two or more regenerators cycle between (a) being charged with thermal energy and (b) giving up that energy, and counter-flowing working fluid streams change back and forth as well. One technique for constructing such a switching regenerator is to use two regenerators that "switch places" using valves. Other techniques, such as rotating regenerator cores, are possible as well, but may still require valves or ports to shut down the flow while the regenerator cores shift. These mechanisms permit a regenerative process to "switch" between working fluid manifolds depending on the direction of working fluid flow and whether the regenerator is being "charged" or "discharged".

FIG. 6 illustrates one embodiment proposed herein for a VSR, in this case where two or more regenerators cycle between being charged with thermal energy and giving up that energy, and two counter-flowing working fluid streams switch back and forth as well.

VSR's would be useful in the B/E-L cycle disclosed in the First Embodiment above to permit efficient exchange of heat between the reactant mix flowing into the endothermic reactor and the product mix flowing out of the endothermic reactor, since the two working fluid streams are at the same pressure and in constant flow. It is obvious that a VSR would allow essentially constant pressure non-stop flow of reactant/reactant mix into the endothermic reactor and non-stop flow of product/product mix out of the endothermic reactor, while simultaneously achieving very high heat exchange between the counter-flowing streams. There would by the VSR's nature be some "mixing" of the two streams during switching, since the gas content within the regenerator cores must be "flushed out" by the first portion of flow in either direction. However, some dilution in either direction is acceptable, since it will be quite easy to lengthen the core of the regenerators such that they can contain a great deal of "stored" or "released" heat between intermittent counter-flows relative to the mass of flowed reactant/reactant mix and product/product mix through each regenerator.

Another use of a VSR is in heat engine cycles that are intermittent, such as within the B/E-Stirling cycle process disclosed in U.S. Pat. No. 3,871,179, FIG. 1, FIG. 2, and FIG. 3. Those Figures detail what can be termed an ideal Stirling heat engine cycle, and while there are stirling engines, there are no known examples of Stirling heat engine cycles. That is because the mechanism portrayed in U.S. Pat. No. 3,871,179, FIG. 1, FIG. 2, and FIG. 3 is, for all intents and purposes, not practical, since it literally requires that pistons in a continual, cyclical process stop instantly in mid-motion, then restart instantly again in motion. Because of this lack of ability for continual motion, a kind of semi-stirling cycle is used in present stirling heat engines, as is well known to any who have studied the Stirling cycle and stirling heat engines in any detail.

Existing stirling regenerators are not valved or ported and posses a single core. However, by substituting the standard single core regenerator for a multi-core VSR, it is possible to envision a different pathway between the compressor segment and the expander segment of a Stirling heat engine cycle, such as, for example, one where there were two or more compressors, coolers, heaters, and expanders function in direct opposition to one another. In FIG. 6, for example, following expansion in a first expander and just prior to expansion in a second expander, (1) valves for the FIG. 6 left core would direct the working fluid flow through a first heater and through the left core, thus storing heat in said left core, then passing the working fluid through a first cooler and into a first compressor, while simultaneously (2) valves would direct the flow through a second cooler and through the FIG. 6 right core, thus receiving previously stored heat, then passing through a second heater and into a second expander. Towards the end of a cycle, all valves would switch, reversing the action.

One issue that will arise for intermittent Stirling VSR cycles will be "pressure mismatching", since the pressures in the two systems will be different when the switch occurs, with one side at maximum compression when the other side is at maximum expansion.

SUMMARY

Various new embodiments of foundational Bland/Ewing (B/E) chemo/thermodynamic cycle are proposed herein:
  a. In a new embodiment of the foundational Bland/Ewing (B/E) chemo/thermodynamic cycle termed a B/E Liquid cycle (B/E-L), pump-pressurizing of non-gaseous reactant/reactants is proposed.
  b. In a second new embodiment, a portion of the B/E cycle's non-gaseous and/or gaseous product/product mix's exothermic reaction, that is, the cycle's otherwise-waste exothermic heat, is used as the heat source for vaporizing and/or preheating non-gaseous and/or gaseous reactant/reactant mix and/or assisting in preheating said non-gaseous and/or gaseous product/product mix or a portion of said product/product mix.
  c. In a third new embodiment of the B/E cycle, termed a B/E Combined cycle (B/E-C), a high temperature heat engine cycle powers a lower temperature B/E cycle with the high temperature waste heat of the high temperature heat engine cycle.
  d. In a fourth new embodiment, ducted/valved regeneration is proposed as a means of increasing the efficiency of heat transfer for B/E cycles

BRIEF DESCRIPTION OF THE DRAWINGS

The invention will be illustrated in greater detail by description in connection with specific examples of the practice of it and by reference to the accompanying drawing, in which:

FIG. 2 is based on a pressure/volume/temperature/BTU/entropy chart from FIG. 70, "Marks Mechanical Engineers' Handbook", 1st edition, 9-148, "Internal-combustion engines", which is incorporated herein by reference.

FIG. 3 is used to refer to shared main points of reference between the three defined B/E-L cycles. In the heat engine schematic in FIG. 3, notwithstanding differences in temperature and pressure, most cycle elements are shared between the three B/E-L heat engine cycles disclosed as the First, Second, and Third Embodiment Operations. That is, the three cycles are each slightly different. However, as will be shown, said shared main points of reference for all three B/E-L heat engine cycles are either the same or can be grouped together as a single point. Where pathways differ slightly, the reference point will show a ( ) or a [ ] surrounding the point label, and a dashed line will be used to represent the different pathway. FIG. 3 also assumes a positive displacement piston-and-cylinder configuration, while recognizing that other approaches such as other positive displacement expanders or multiple turbine blade expanders are clearly also possible.

DETAILED DESCRIPTION

Description—First Embodiment

Figure 1:
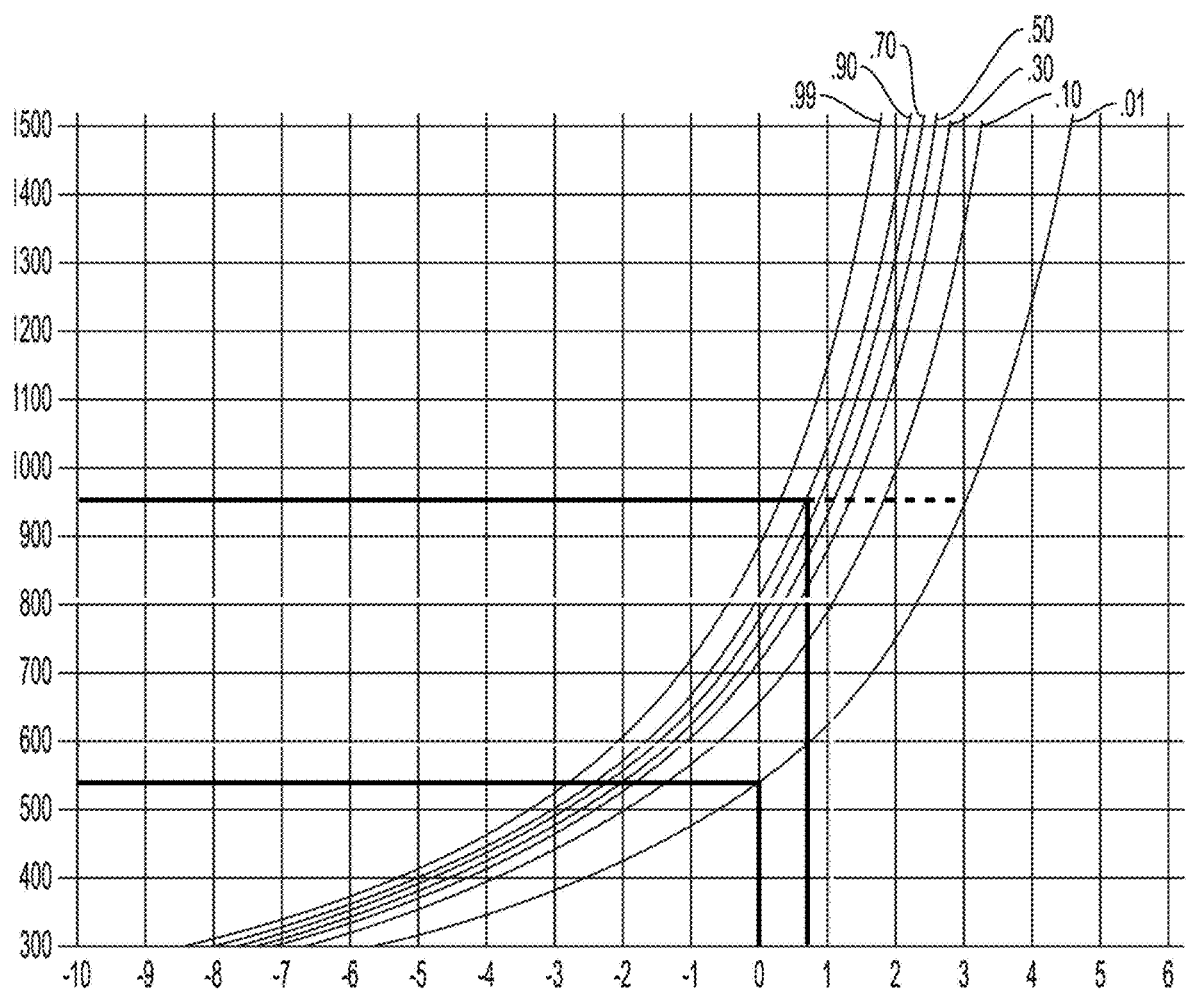
FIG. 1 is based on FIG. 1 in U.S. Pat. No. 3,225,538, which details the endothermic reaction and exothermic reaction pressures, temperatures, and conversion percentages for one possible Bland/Ewing Liquid cycle (B/E-L cycle) cyclical cyclohexane/benzene+hydrogen ($C_6H_{12}\Longleftrightarrow C_6H_6+3H_2$) catalytic process, with temperatures in degrees Kelvin and pressure in atmospheres measured logarithmically to the base 10.

It has been found that the both the mechanical efficiency and the delivered thermal efficiency of a B/E cycle heat engine can be further increased with a B/E-L cycle. Recall that delivered thermal efficiency is a function of mechanical efficiency. In a B/E-L cycle, much as in a steam engine, mechanical efficiency is increased by first pressurizing the reactant in a liquid or solid state and then converting the fluid into a vapor. However, unlike a steam engine, the conversion of a solid or liquid to a gas does not represent a loss of overall thermal efficiency, but quite the opposite. Using a portion of the exhaust heat liberated by the exothermic reaction of a portion of the product produced by the B/E engine actually increases the overall thermal efficiency of the engine because, unlike the normal steam engine, there is the potential of a very large reservoir of otherwise-waste heat available to assist a phase change or changes. Recall that delivered thermal efficiency is equal to net work out divided by total source heat in. Since a B/E cycle's exhaust heat is for the most part equal to the heat liberated by the product's exothermic reaction, it is clear that, to the degree the product's liberated heat can be used to supply heat back to the heat engine, thus replacing source heat, the delivered thermal efficiency of the B/E cycle will be improved.

Using a B/E-L cycle to "power" any conversion of pressurized non-gaseous working fluid into a pressurized gaseous working fluid is a new B/E cycle embodiment, first by increasing the potential thermal efficiency of a B/E-L cycle itself through the use of otherwise-waste higher grade heat, but second by proposing a very important use of the stored thermochemical energy that is a major byproduct of any B/E cycle. Note that this larger usefulness is proposed and disclosed in FIG. 11 of U.S. Pat. No. 3,225,538, wherein it states, in Column 14, paragraph 4, beginning on line 68: "In FIG. 11, the system 80, illustrated therein is one in which the endothermic-exothermic cycle of this invention is adapted for supplying heat to a secondary thermodynamic cycle, such secondary cycle being designated generally by reference numeral T-7." Continuing on Column 15, paragraph 1, line 2: "The illustrated secondary system T-7 constitutes a simplified steam generating station or power plant. There is a boiler 82 arranged in heat exchange relationship with the exothermic reaction chamber 27, as by encircling the reaction chamber. A pump 83 for the liquid phase of the secondary cycle precedes the boiler for passing water into the boiler 82. From the boiler wherein the fluid of the secondary cycle is converted from a liquid phase to a vapor phase, the steam flows through conduit 84 to the heat exchanger 76-11 where the steam becomes superheated. From the superheater 76-11 the steam flows through the conduit 85 to an engine or turbine 86 which is adapted to drive a generator 87, for example, as for production of electrical power. From the turbine 86 the expanded steam passes through a conduit 88 to a condenser 89 where the secondary fluid is converted from vapor to liquid phase. From the condenser the water is passed by conduit 90 back to the pump 83, thus completing the cycle of the power plant system."

That is to say, any excess waste heat captured in the product may be used to supply the thermal energy to convert a non-gaseous substance at some pressure into a gaseous substance at some pressure. And that process will aid in increasing the thermal efficiency of not only the B/E-L heat engine cycle it is generated by, but the thermal efficiency of whatever heat engine cycle it is employed on. The thermal efficiency of such combined heat engine cycles is then calculated as the total source heat put in for both engines divided into the total net work that is put out by both engines.

Figure 3:
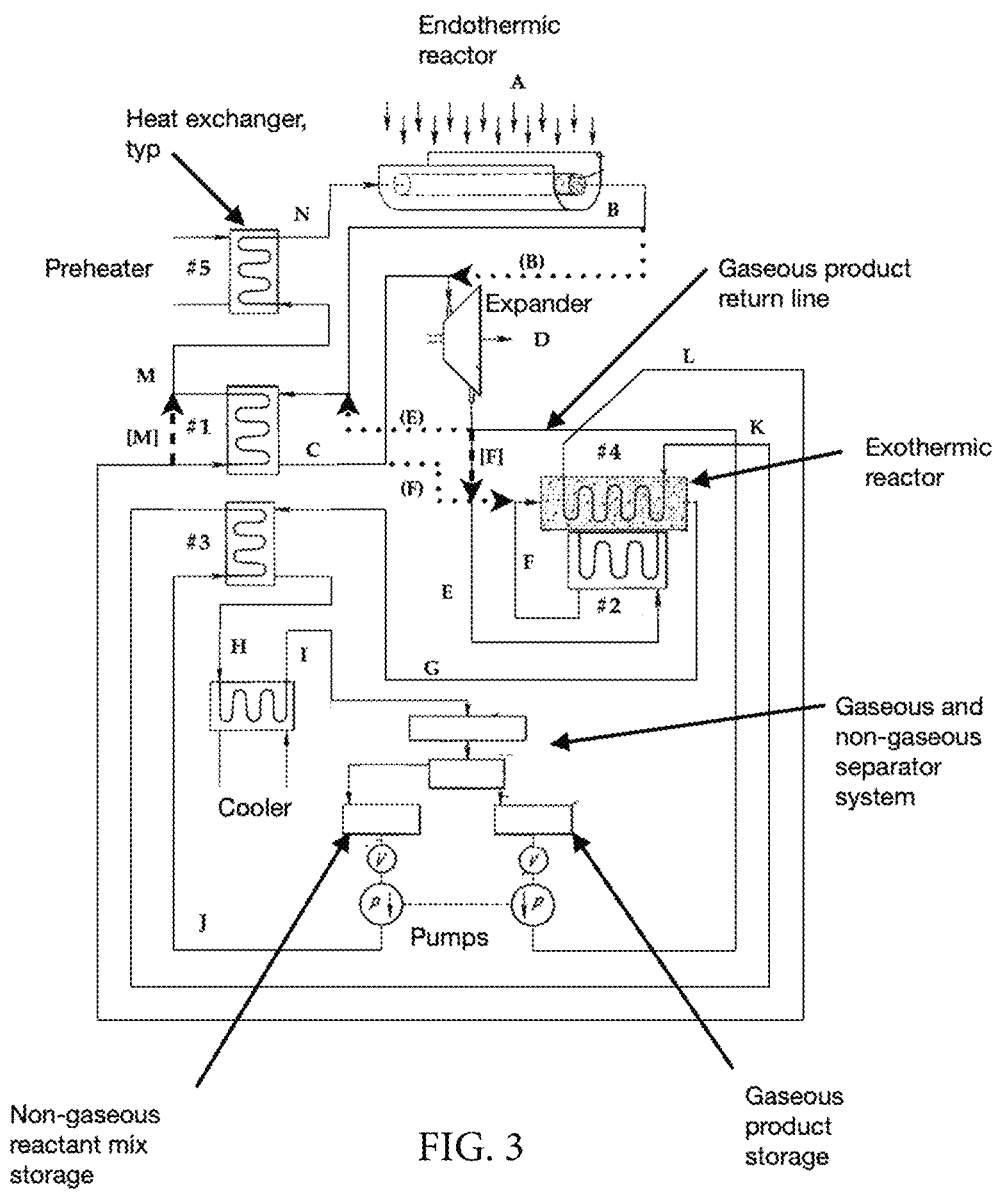
FIG. 3 is a schematic used to illustrate multiple B/E-L closed cycle externally-heated engines, including the B/E-L closed cycle engine graphed in FIG. 2 and the two B/E-L closed cycle engines graphed in FIG. 5. That is.
Figure 4:
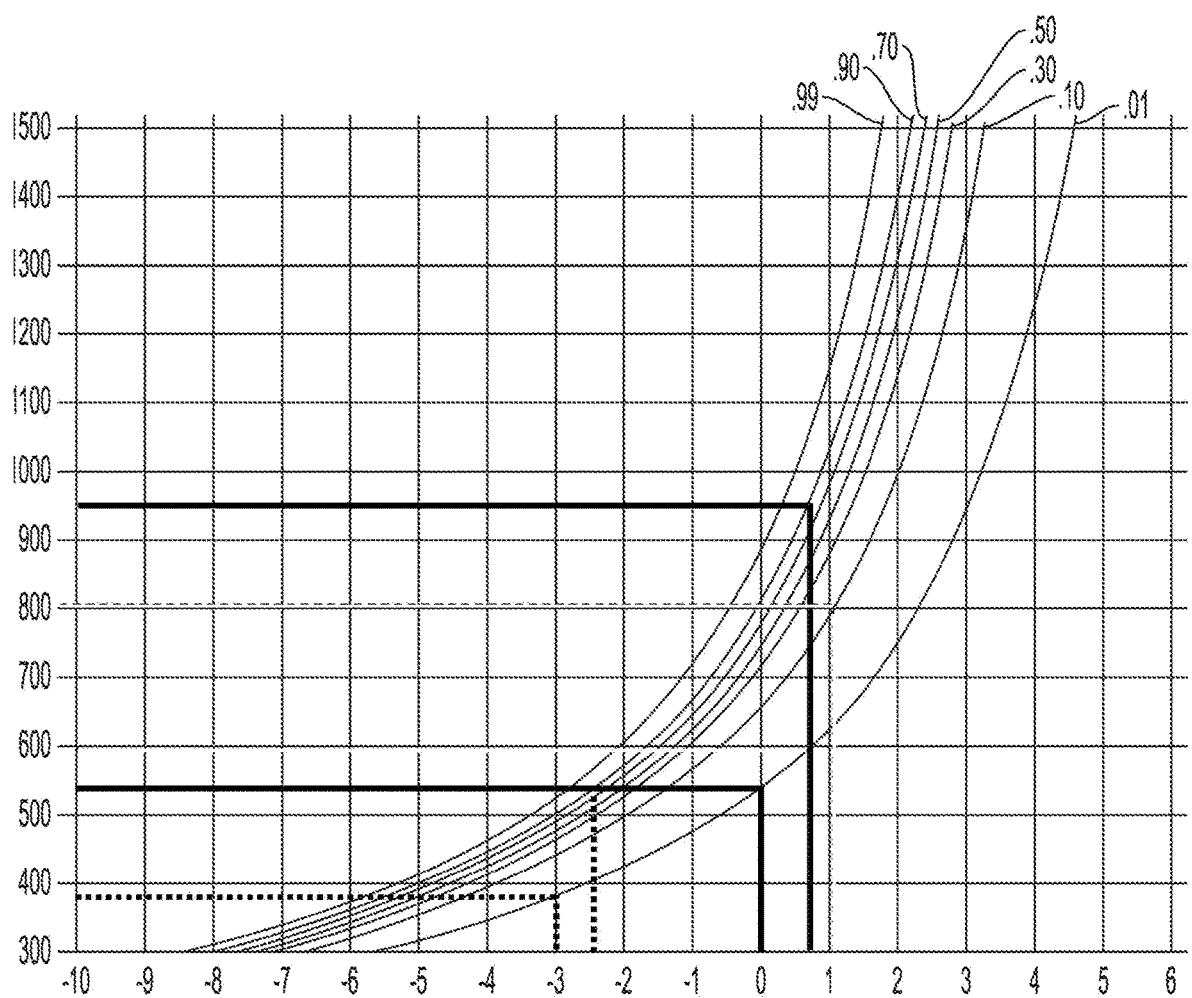
FIG. 4 is similar to FIG. 1 and details the endothermic reaction and exothermic reaction pressures, temperatures, and conversion percentages for one possible B/E Combined (B/E-C) cycle dual chemo/thermodynamic cycle heat engine. In this instance, both engines use the $C_6H_{12}\Longleftrightarrow C_6H_6+3H_2$ catalytic process. It is considered obvious that different catalytic chemo/thermodynamic combinations are possible.

In the heat engine cycle described and disclosed in U.S. Pat. No. 3,225,538 FIG. 11, since the B/E cycle being used to generate the thermal energy is not a B/E heat engine cycle, the only heat engine cycle that can be seen to "gain" will be the steam engine cycle described and disclosed in U.S. Pat. No. 3,225,538 FIG. One new embodiment for the larger B/E cycle is to substitute the B/E cycle shown in FIG. 11 with a B/E heat engine cycle such as is illustrated in FIG. 3 and FIG. 4 of U.S. Pat. No. 3,225,538. A second new embodiment for the B/E cycle is to substitute the B/E cycle shown in FIG. 11 with a B/E-L heat engine cycle such as are detailed in FIG. 3 of this disclosure.

FIG. 1 below is based on FIG. 1 in U.S. Pat. No. 3,225,538, which details a cyclical cyclohexane and highly reversible benzene-plus-hydrogen catalytic process ($C_6H_{12}$<=>$C_6H_6$+$3H_2$), with temperatures in degrees Kelvin and pressure in atmospheres measured logarithmically to the base 10. Per FIG. 1, a $C_6H_{12}$<=>$C_6H_6$+$3H_2$ catalytic process at a given temperature and pressure will be either endothermic or exothermic. For example (shown as thick solid lines), at a pressure of 5 atmospheres, the temperature for 90% endothermic conversion equals approximately 950 K (1,710 R), while the temperature for 99% exothermic conversion equals approximately 600 K (972 R). Conversely, the endothermic and exothermic temperatures may be made equal by varying the pressure of the catalytic reaction. As shown by the thick dashed line, a 99% exothermic reaction will occur at a temperature of approximately 950 K and a pressure of approximately 1,000 atmospheres, and vice versa.

Figure 2:
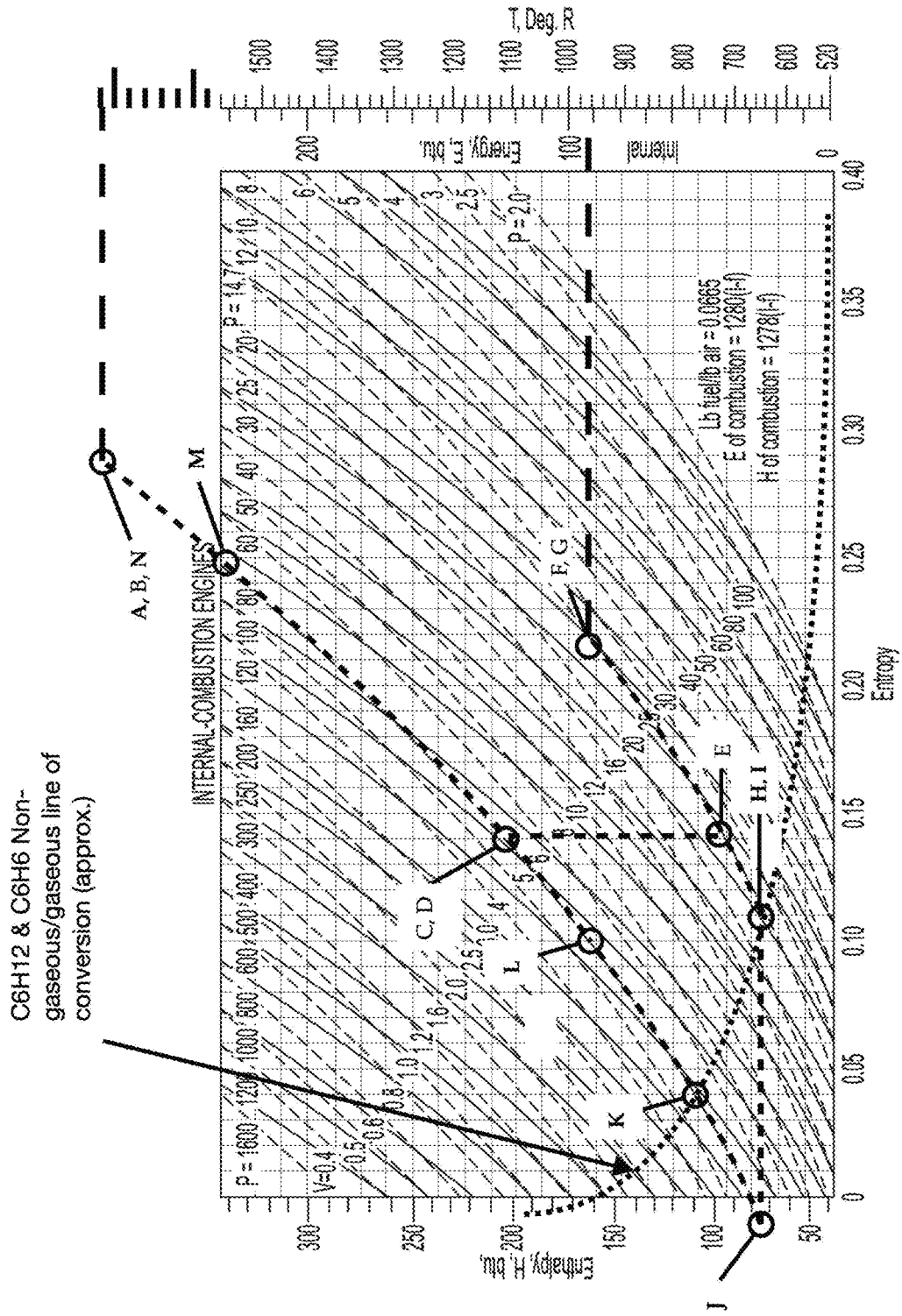
FIG. 2 shows a combined graph of the thermodynamic states for one possible B/E-L cycle configured as a closed cycle externally-heated engine modeled in FIG. 1.

FIG. 2 and FIG. 3 illustrate one approach to constructing a B/E-L Cycle. FIG. 2 shows a pressure/volume/temperature/BTU/entropy chart from FIG. 70, "Marks Mechanical Engineers' Handbook", 1st edition, 9-148, "Internal-combustion engines". The chart in FIG. 2 is used to prepare first order estimates of the various heat engine cycles proposed herein. FIG. 2 temperatures are measured in degrees R. The short dashed lines show the proposed B/E-L Cycle superimposed on the chart. The long dashed lines represent the two constant temperature and constant pressure endothermic reactions which create a corresponding change in volume due to chemo/thermodynamic expansion and chemo/thermodynamic compression. Accordingly, they do not "fit" on the chart, but are shown for expository purposes only.

Since it was important to keep the cycle elements roughly within the chart's shown boundaries, in this embodiment, a maximum pressure of approximately 75 psi (5 atmospheres) is assumed. In addition, the degree of endothermic conversion has been lowered to 90%. By lowering the degree of endothermic conversion to 90%, the required temperature input at approximately 75 psi has been lowered. A maximum endothermic temperature is assumed of approximately 1,710 R, (950 K, 677° C., 1,250° F.). A post-expansion pressure of approximately 15 psi (1 atmosphere) is likewise assumed (shown as 0 in FIG. 1). For a 99% exothermic conversion, that would equal an exothermic catalytic reaction temperature of approximately 972 R (540 K, 267° C., 512° F.).

In lowering the degree of endothermic conversion, the cycle's theoretical power density and hence potential real world thermal efficiency is lowered. That is, after the 90% conversion of 1 mol of $C_6H_{12}$, there will be 0.1 mol of $C_6H_{12}$, 0.9 mol of $C_6H_6$, and 2.7 mol of $H_2$, resulting in a molecular expansion of 1- to −3.7 rather than 1- to −4.0. It is quite possible that, during testing, the endothermic reaction temperature may be elevated sufficiently to approach a 99% result.

Engine Elements of the Proposed Embodiment.

Looking at the specific B/E-L cycle illustrated in FIG. 1 and FIG. 2, it will be seen that, unusually for a heat engine, a heat exchanger is situated between the heat source and the expander. Recall that this embodiment is assuming the use of a positive displacement piston-and-cylinder arrangement. Looking at the $C_6H_{12}$<=>$C_6H_6$+$H_2$ reaction, $C_6H_6$ (benzene) is chemically highly active. Therefore, parts of the engine that will come in contact with benzene such as the pistons, connecting rod, cylinder head, cylinder base, valves, connecting manifolds, seals, etcetera, will need to either be fabricated from or plated with non-reactive materials such as stainless steel, teflon, or nickel. The B/E Cycle also creates unique challenges in the area of engine seals. Stainless seals are possible, but seal lubrication becomes an issue. Lubrication is generally important as a means of reducing friction losses and increasing engine durability, but lubricants in the thermochemical working fluid could seriously impact the quality of a thermochemical cycle. Ideally, a non-reactive material that doesn't require lubrication such as teflon would be used where required.

However, in the example of the $C_6H_{12}$<=>$C_6H_6$+$3H_2$ cycle engine operating with a peak temperature of approximately 1,710 R (FIG. 2), that temperature is far in excess of the temperature teflon can support. Teflon seals will work up to about 1,000 R, but no commonly known low friction, non-lubricated, chemically inert seal can handle a constant temperature of 1,710 R.

One approach to reducing seal temperature is to create a positive displacement "blended" expansion cycle. That is, work is done initially at constant pressure with the entry of the working fluid into the positive displacement expander via an inlet valve. After some isobaric expansion, the inlet valve is closed and an isentropic expansion process continues, thus dropping the average temperature of the working fluid that seals are subjected to per cycle. A piston extension can also be used to further isolate the seals from the higher temperature portion of the cylinder walls. However, with an inlet temperature of 1,710°, it will still be difficult to expand isentropically to a temperature sufficient to protect teflon piston seals.

One proposed solution and embodiment is to exchange heat between the cooler C6H12 constant pressure reactant stream entering the endothermic reactor and the hotter constant pressure C6H6+3H2 product stream exiting the reactor. Of course, such a thermal exchange can be shown to significantly lower the potential thermal efficiency of the engine, (by essentially reducing the peak temperature seen by the expansion process). However, the engine will still be capable of excellent power density, which will optimize the theoretical thermal efficiency that remains.

A second proposed solution and embodiment is to operate the engine within a lower temperature/pressure regime. This can be accomplished, for example, in a vacuum with a lower available sink temperature, such as can be found in Permanently Shadowed Regions (PSRs) of Earth's Moon's polar regions. Note that a lower pressure will permit less massive construction of the engine, the vacuum will reduce heat loss from convection, and the very low temperatures of the PSRs will allow much colder temperatures of both gaseous and non-gaseous stored reactants and products, reducing storage tank dimensions for the gaseous constituents and increasing the amount of otherwise-waste heat absorbable by the non-gaseous constituents, thus increasing theoretical thermal efficiency.

In the analysis that follows, it is assumed that the temperature of the product at the beginning of the isobaric portion of the expansion cycle has been cooled to approximately 1,180 R (656 K). This should be considered a tentative starting point. The actual endothermic working fluid temperature at which this specific B/E-L heat engine will be capable of continually operating will be determined experimentally.

As noted earlier, a positive displacement system is assumed, comprising a compression cylinder/piston arrangement and an expansion cylinder/piston arrangement. An interesting further embodiment of this type of B/E-L cycle is to connect the compressor and the expander via a unique mechanism termed a "valved cell". U.S. Pat. No. 4,817,388, Engine with Pressurized Valved Cell, and U.S. Pat. No. 5,179,839, Alternative Charging Method for Engine with Pressurized Valved Cell, both granted to Joseph B. Bland, disclosed the concept of an auxiliary cell connecting a compressor to an expander via a "transfer valve".

The process described in U.S. Pat. No. 4,817,388 is as follows: "There is, therefore, provided in practice of this invention according to a presently preferred embodiment a method of operating an engine comprising the steps of compressing a gas to a pressure approximately the same as a pressure in the engine, temporarily isolating a mass of the compressed gas, and opening communication between the isolated gas and the engine while the isolated gas is at approximately the same pressure as in the engine for intermittently releasing substantially all of the temporarily isolated mass of gas into the engine for expansion." U.S. Pat. No. 5,179,839 discloses an alternate means of accomplishing the same result.

As stated in the patents, an intake valve is used to connect the compressor to the valved cell and a a "transfer valve" is used to connect the valved cell to the expander. The transfer valve is designed to instantly connect the valved cell to the expander just following early closure of the expander exhaust valve and the naturally-resulting recompression of remnant gases thus trapped in the cylinder head to at least the pressure of the gas within the valved cell. Finally, constant pressure recharging of the valved cell is made to occur just following or just prior to instant closure of the transfer valve following constant pressure displacement of the contents within the valved cell into the expander, depending on the use of either the charging system of U.S. Pat. No. 4,817,388 or the use of the charging system of U.S. Pat. No. 5,179,839.

It is understood that both the transfer valve and the valved cell inlet valve will be subjected to the peak temperature of the engine on a continual basis, and thus will require substantial cooling, for example through the use of liquid C6H12 and teflon seals on the stems of poppet-type valves.

Operation-First Embodiment

Table 1 below indicates the essential points in one embodiment of a B/E-L, represented by letters shown in FIG. 2 and FIG. 3:

Table 1

A—A gaseous reactant/reactant mix at approximately 75 psi and approximately 1,710 R is passed through an endothermic catalytic reaction chamber where it undergoes a partial (C6H12=>C6H6+3H plus remnant C6H12) isobaric and isothermal catalytically-induced endothermic expansion and conversion to a gaseous product mix using source heat at approximately 1,710 R (concentrated solar energy may be used, as shown in FIG. 3).

B—Said gaseous product mix exhausts from said catalytic reaction chamber at approximately 75 psi and approximately 1,710 R.

C—Said gaseous product mix is passed at constant pressure through heat exchanger #1, dropping said gaseous product mix to approximately 1,180 R and exhausting said product mix into a positive displacement expander cylinder at approximately 75 psi.

D—Isobaric expansion completes, isentropic expansion begins.

E—An isentropic expansion of approximately 1:5 ends at approximately 15 psi and approximately 750 R.

F—Said gaseous product mix exhausts at approximately 15 psi through heat exchanger #2, raising said gaseous product mix to approximately 972 R.

G—Said gaseous product mix at approximately 15 psi and approximately 972 R is passed through an exothermic catalytic reaction chamber where it undergoes a partial (C6H12<=C6H6+3H2 plus remnant C6H12) isobaric and isothermal catalytically-induced exothermic compression and conversion to a gaseous reactant/reactant mix, yielding back approximately 99% of the endothermically-stored heat in the product mix at approximately 972 R.

H—Said gaseous reactant mix is subject to isobaric cooling via heat exchanger #3 to approximately 640 R.

I—Via the cooler, said gaseous reactant mix is subject to isobaric condensation into a non-gaseous reactant mix and a gaseous remnant product mix (H2), and the gaseous remnant product mix is pumped back through the gaseous product return line into the product mix exiting the expander.

J—Said non-gaseous reactant mix is isothermally pump-pressurized to approximately 75 psi.

K—Said non-gaseous reactant mix is preheated in heat exchanger #3 and be partially converted into a partially non-gaseous reactant mix.

L—Said partially non-gaseous reactant mix is converted into a completely gaseous reactant mix at approximately 75 psi and approximately 972 R using a portion of the exothermic reaction heat via heat exchanger #4.

M—Said gaseous reactant mix is preheated via heat exchanger #1.

N—Said gaseous reactant mix is heated by the primary heat source to approximately 1,710 R via heat exchanger #5.

And so on.

Following the flow process illustrated in FIG. 2, FIG. 3, and Table 1:

A. A reactant or gaseous reactant mix of primarily C6H12 with some remnant C6H6 at approximately 75 psi and approximately 1,710 R will be converted primarily to a gaseous product mix C6H6+3H2 plus remnant C6H12 in an endothermic catalytic reactor at a temperature of approximately 1,710 R using source heat (concentrated solar energy shown). Said gaseous product mix will undergo a chemo/thermodynamic molecular volumetric expansion of about 3.7 times the volume prior to endothermic dissociation.

B. Said gaseous product mix at approximately 75 psi and approximately 1,710 R will be exhausted from the endothermic catalytic reactor and through counterflow heat exchanger #1.

C. In counterflow heat exchanger #1, said gaseous product mix at approximately 75 psi and approximately 1,710 R will exchange heat with cool inflowing gaseous reactant mix (at approximately 972 R), dropping the approximately 75 psi C6H6+3H2 mixture to approximately 1,180 R.

D. In the piston-and-cylinder positive displacement expander, just prior to TDC, the expander cylinder exhaust valve will be closed. Further travel to TDC will automatically recompress remnant gas. Consequently, at TDC the expander inlet valve/transfer valve will be partially opened by said recompression of remnant gas. A force such as a stainless steel spring then completely opens the transfer valve. Isobaric expansion of said gaseous product mix will begin. Shortly after TDC, the expander inlet valve/transfer valve will be quickly closed, for example by solenoid action, having charged the expander cylinder with a set quantity of gaseous product mix at approximately 75 psi and approximately 1,180 R and thus at constant pressure and temperature.

E. With the near-instantaneous closure of the expander inlet valve/transfer valve, an isentropic expansion of the gaseous product mix will then occur as the piston travels to BDC, dropping the gas to approximately 15 psi and approximately 750 R. Following isentropic expansion, the expander exhaust valve will be opened and the expansion piston will exhaust said gaseous product mix at constant pressure and temperature (approximately 15 psi and approximately 750 R) into radiant heat exchanger #2.

F. The gaseous product mix will then receive heat from and partially cool a nearby exothermic catalytic reactor, raising said gaseous product mix to approximately 972 R.

G. Simultaneously, said gaseous product mix at approximately 15 psi and approximately 972 R will exhaust through the exothermic catalytic reactor, converting said gaseous product mix at constant pressure and temperature to a gaseous reactant mix of primarily C6H12 plus remnant C6H6 and H2 while simultaneously undergoing a molecular compression to about 1/3.7th of the prior molal volume.

H. Simultaneously, said gaseous reactant mix at approximately 15 psi and approximately 972 R will exhaust through counterflow heat exchanger #3, cooling it to approximately 640 R.

I. Simultaneously, said cooled gaseous reactant mix will exhaust through a cooler, dropping to less than 640 R and condensing into a non-gaseous reactant mix (C6H12 and remnant C6H6) and remnant gaseous product (H2). The non-gaseous reactant mix will be sent to storage. Any remnant gaseous product entrained in the stream leaving counterflow heat exchanger #3 and/or the cooler will be separated from the liquid and be pumped at low pressure back to the exhaust stream leaving the expander via a gaseous product return line (see FIG. 3), where it will be run back through the exothermic reactor.

J. The separated non-gaseous reactant mix will then be removed from storage and isothermally pumped-pressurized to approximately 75 psi.

K. The approximately 75 psi non-gaseous reactant mix will then be warmed by the approximately 15 psi gaseous reactant mix passing through counterflow heat exchanger #3 and be partially converted into a partially non-gaseous reactant mix.

L. The approximately 75 psi partially non-gaseous reactant mix will then be used to further cool the exothermic reactor in radiant heat exchanger #4, simultaneously converted any remaining non-gaseous reactant mix into a gaseous reactant mix at a temperature of approximately 972 R.

M. The approximately 75 psi gaseous reactant mix will then be partially raised in temperature (for example, to approximately 1,560 R) by counterflow heat exchanger #1, receiving heat from the gaseous product mix exiting the endothermic reactor.

N. The approximately 75 psi gaseous reactant mix will then use heat source radiant heat exchanger #5 to reach the required maximum temperature (approximately 1,710 R) just prior to being fed to the endothermic reactor. And thus back to the initial state.

Description—Second Embodiment

Figure 5:
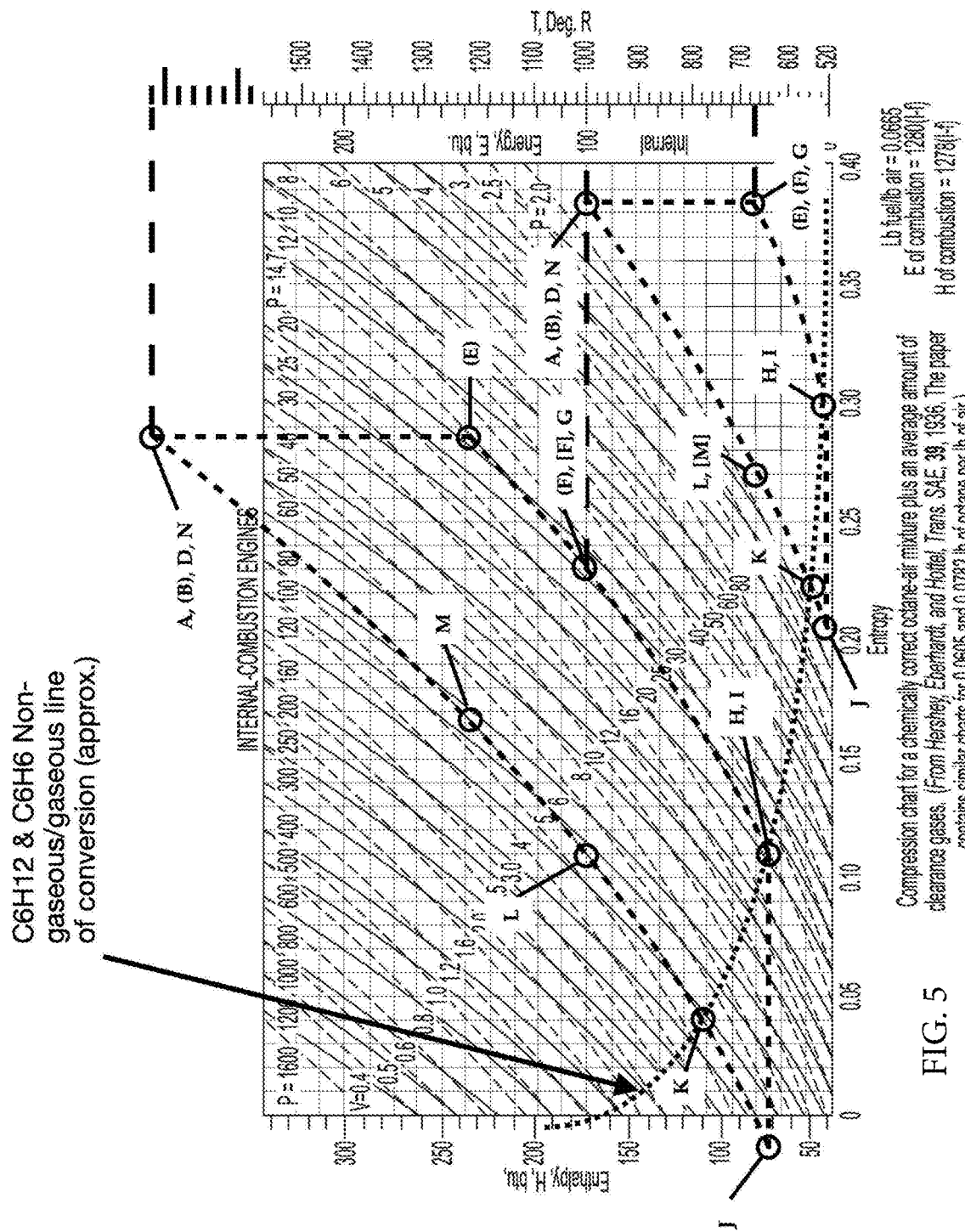
FIG. 5 is similar to FIG. 2 and shows a combined graph of the chemo/thermodynamic states for one embodiment of the B/E-C cycle heat engine whose endothermic and exothermic reaction data is shown in FIG. 4. In the B/E-C embodiment shown, two closed cycle externally-heated B/E-L engines illustrate a possible configuration, the hotter-running B/E-L engine of which in this case uses its exothermic reactor to supply the source heat for the cooler running B/E-L engine.

In a second embodiment of the B/E-L heat engine cycle, the first of two new embodiments of B/E-L heat engine cycles is shown in FIG. 4 and FIG. 5 that jointly increase the thermal efficiency of a B/E-C(B/E Combined) heat engine cycle by combining a high temperature heat engine cycle, which in this instances is a high temperature B/E-L heat engine cycle (HT B/E-L heat engine cycle), used in conjunction with a low temperature B/E-L heat engine cycle (LT B/E-L heat engine cycle), where said LT B/E-L heat engine cycle is used as a "bottoming cycle" heat engine, the two arranged thusly as to create a type of B/E-C heat engine cycle. A B/E-C heat engine cycle is one where a high temperature heat engine's waste heat may serve as a complete or partial heat source for a LT B/E-L heat engine cycle. For description purposes, a C6H12<=>C6H6+3H2 cycle is defined for both cycles, although it is considered obvious that neither specific chemo/thermodynamic heat engine cycle may be separately or in combination the most preferential thermodynamic and/or chemo/thermodynamic heat engine combined cycle. That is, this embodiment is considered only an example of a B/E-C heat engine cycle.

The heavy solid lines in FIG. 4 show the variance in pressures and temperatures for endothermic and exothermic reactions for said HT B/E-L heat engine cycle, and the dashed lines in FIG. 4 show the variance in pressures and temperatures for endothermic and exothermic reactions for said LT B/E-L heat engine cycle.

For the HT B/E-L heat engine cycle embodiment herein described, at a pressure of about 5 atmospheres and an endothermic temperature of about 950 K, about a 90% conversion to a gaseous product mix occurs, while at a pressure of about 1 atmosphere and an exothermic temperature of about 550 K, about a 99% conversion to a gaseous reactant mix occurs.

Operation—Second Embodiment

Table 2 below indicates the essential points in a second embodiment of a B/E-L, represented by letters shown in FIG. 3, FIG. 4, and FIG. 5:

Table 2
- A—A gaseous reactant/reactant mix at approximately 75 psi and approximately 1,710 R is passed through an endothermic catalytic reaction chamber where it undergoes a partial (C6H12=>C6H6+3H2+ remnant C6H12) isobaric and isothermal catalytically-induced endothermic expansion and conversion to a gaseous product mix using source heat at approximately 1,710 R (concentrated solar energy may be used, as shown in FIG. 3).
- (B)—As shown with the dashed lines in FIG. 3, said gaseous product mix at approximately 75 psi and approximately 1,710 R exhausts directly into an expander. Assuming a positive displacement piston-and-cylinder expander, expansion begins with an isobaric expansion and then completes with an isentropic/adiabatic expansion.
- D—Isobaric expansion completes, isentropic expansion begins.
- (E)—An isentropic expansion of approximately 1:5 ends at to approximately 15 psi and approximately 1,230 R.
- (F)—Said gaseous product mix exhausts at approximately 15 psi through heat exchange #1, reducing said gaseous product mix to approximately 972 R.
- G—Said gaseous product mix at approximately 15 psi and approximately 972 R is passed through an exothermic catalytic reaction chamber where it undergoes a partial (C6H12<=C6H6+3H2 plus remnant C6H12) isobaric and isothermal catalytically-induced exothermic compression and conversion to a gaseous reactant/reactant mix, yielding back approximately 99% of the endothermically-stored heat in the product mix at approximately 972 R.
- H—Said gaseous reactant mix is subject to isobaric cooling via heat exchanger #3 to approximately 640 R.
- I—Via the cooler, said gaseous reactant mix is subject to isobaric condensation into a non-gaseous reactant mix and a gaseous remnant product mix (H2), and the gaseous remnant product mix is pumped back through the gaseous product return line into the product mix exiting the expander.
- J—Said non-gaseous reactant mix is isothermally pump-pressurized to approximately 75 psi.
- K—Said non-gaseous reactant mix is preheated in heat exchanger #3 and be partially converted into a partially non-gaseous reactant mix.
- L—Said non-gaseous reactant mix is converted into a completely gaseous reactant mix at approximately 75 psi using a portion of the exothermic reaction heat via heat exchanger #4.
- M—Said gaseous reactant mix is preheated via heat exchanger #1.
- N—Said gaseous reactant mix is heated by the primary heat source to approximately 1,710 R via heat exchanger #5.

And so on.

Following the flow process illustrated in FIG. 3, FIG. 5, and Table 2:
- A. A reactant or gaseous reactant mix of primarily C6H12 with some remnant C6H6 at approximately 75 psi and approximately 1,710 R will be converted primarily to a gaseous product mix C6H6+3H2 plus remnant C6H12 in an endothermic catalytic reactor at a temperature of approximately 1,710 R using source heat (concentrated solar energy shown). Said gaseous product mix will undergo a chemo/thermodynamic molecular volumetric expansion of about 3.7 times the volume prior to endothermic dissociation.
- (B). As shown with the dashed lines in FIG. 3, said gaseous product mix at approximately 75 psi and approximately 1,710 R exhausts directly into the expander, creating an initial isobaric expansion. This is as distinct from step B in the first embodiment, where the product first passes through cooling heat exchanger #1 prior to passing into the expander. The inference is that a high temperature and high expansion ratio expander is used. One possible approach is to use a gas turbine as a first stage expander that then exhausts into a lower pressure, lower temperature positive displacement expander.
- C. (Bypassed)
- D. In the piston-and-cylinder positive displacement expander, just prior to TDC, the expander cylinder exhaust valve will be closed. Further travel to TDC will automatically recompress remnant gas. Consequently, at TDC the expander inlet valve/transfer valve will be partially opened by said recompression of remnant gas. A force such as a stainless steel spring then completely opens the transfer valve. Isobaric expansion of said gaseous product mix will begin. Shortly after TDC, the expander inlet valve/transfer valve will be quickly closed, for example by solenoid action, having charged the expander cylinder with a set quantity of gaseous product mix at approximately 75 psi and approximately 1,710 R and thus at constant pressure and temperature.
- (E). With the near-instantaneous closure of the expander inlet valve/transfer valve, an isentropic expansion of the gaseous product mix will then occur as the piston travels to BDC, dropping the gas to approximately 15 psi and approximately 1,230 R.
- (F). As shown with the dashed lines in FIG. 3, isobaric exhaust and cooling of said gaseous product mix at approximately 15 psi and approximately 1,230 R occurs via heat exchanger #1, exiting heat exchanger #1 at approximately 15 psi and approximately 972 R. Since said gaseous product mix temperature exiting heat exchanger #1 is approximately equal to the exothermic catalytic reactor temperature, radiant heat exchanger #2 is not required, and said gaseous product mix is therefore exhausted directly from heat exchanger #1 into said exothermic catalytic reactor.
- G. Simultaneously, said gaseous product mix at approximately 15 psi and approximately 972 R will exhaust through the exothermic catalytic reactor, converting said gaseous product mix at constant pressure and temperature to a gaseous reactant mix of primarily C6H12 plus remnant C6H6 and H2 while simultaneously undergoing a molecular compression to about 1/3.7th of the prior molal volume.

H. Simultaneously, said gaseous product mix at approximately 15 psi and approximately 972 R will exhaust into counterflow heat exchanger #3, which will ideally cool said gaseous product mix to approximately 640 R.
I. Simultaneously, said cooled gaseous reactant mix will exhaust through a cooler, dropping to less than 640 R and condensing into a non-gaseous reactant mix (C6H12 and remnant C6H6) and remnant gaseous product (H2). The non-gaseous reactant mix will be sent to storage. Any remnant gaseous product entrained in the stream leaving counterflow heat exchanger #3 and/or the cooler will be separated from the liquid and be pumped at low pressure back to the exhaust stream leaving the expander via a gaseous product return line (see FIG. 3), where it will be run back through the exothermic reactor.
J. The separated non-gaseous reactant mix will then be removed from storage and pumped-pressurized to approximately 75 psi.
K. The approximately 75 psi non-gaseous reactant mix will then be warmed by the approximately 15 psi gaseous reactant mix passing through counterflow heat exchanger #3 and be partially converted into a gaseous reactant mix. L. The approximately 75 psi partially non-gaseous reactant mix will then be used to further cool the exothermic reactor in radiant heat exchanger #4, simultaneously converted any remaining non-gaseous reactant mix into a gaseous reactant mix at a temperature of approximately 972 R.
M. The approximately 75 psi gaseous reactant mix will then be partially raised in temperature (for example, to approximately 1,560 R) by counterflow heat exchanger #1, being heated with the gaseous product mix exiting the endothermic reactor.
N. The approximately 75 psi gaseous reactant mix will then use heat source radiant heat exchanger #5 to reach the required maximum temperature (approximately 1,710 R) just prior to being fed to the endothermic reactor.

And thus back to the initial state.

Description—Third Embodiment

A B/E-C cycle is shown in FIG. 3, FIG. 4 and FIG. 5 that increases the thermal efficiency of a heat engine cycle by adding in a B/E heat engine "bottoming cycle" to create a "combined cycle" heat engine. This Description is focused on the third embodiment, or one possible LT B/E-L heat engine "bottoming" cycle. For description purposes, the C6H12<=>C6H6+3H2 cycle is shown for this cycle, although this may not be the most preferential chemo/thermodynamic cycle.

As stated earlier, the heavy solid lines in FIG. 4 show the variance in pressures and temperatures for endothermic and exothermic reactions for one possible high temperature B/E-C engine, and the dashed lines in FIG. 4 show the variance in pressures and temperatures for endothermic and exothermic reactions for one possible low temperature B/E-C engine. While the two cycles are very different in terms of pressures, temperatures, and volumes, the main points of reference for both engines are either the same or can be grouped together as a single point of reference and thus will be used for reference within FIG. 3, FIG. 4, and FIG. 5.

For the proposed embodiment of the LT B/E-C heat engine, at a pressure of approximately 0.0075 atmospheres (0.11 psi) and a temperature of approximately 550 K, a 90% endothermic reaction will occur. At a pressure of approximately 0.001 atmosphere (0.015 psi) and a temperature of approximately 375 K, a 99% exothermic reaction will occur. The expansion ratio of this embodiment of a LT B/E-L heat engine cycle would thus equal approximately 7.3 to 1.

While it may appear that an ultra-low pressure B/E heat engine cycle such as is used here as an example may not be functional, the mechanical efficiency of such an engine should be quite high, due to the thermochemical expansion process of the B/E heat engine concept and the low thermal and physical stresses. One place where there may be a meaningful application for such a cycle is in space or on the lunar surface, where a near-perfect vacuum exists. In a vacuum, there is no need to limit expansion to that of an external atmospheric pressure. In addition, cooling of surfaces should be eliminated at low temperatures, and thermal losses can be highly limited in a vacuum. Also, unlubricated teflon seals should be adequate throughout, reducing friction losses. Finally, walls of chambers can be exceedingly thin and low mass, as can positive displacement elements such as pistons. Volumes of positive displacement equipment can thus be very large, compared to terrestrial systems, yet be very low in mass in a vacuum, such as on the lunar surface.

There is no requirement for the a low temperature thermochemical cycle to use the same reversible thermochemical cycle as the high temperature engine. For example, a high temperature B/E-L engine can use the reversible C6H12<=>C6H6+3H2 reaction and a low temperature B/E-L engine can utilize the reversible N2O4<=>2NO2 reaction mentioned in U.S. Pat. No. 3,225,538. Regarding the reversible N2O4<=>2NO2 chemo/thermodynamic heat engine cycle, NASA Report TM-79322, page 4, first paragraph says the following: "The first stage of the dissociation (N2O4<=>2NO2) occurs mainly over the temperature range 70 [deg F.] to 340 deg F." Continuing on page 6, first paragraph: "The first stage of the dissociation (N2O4<=>2NO2) is almost instantaneous . . . ". Since the exothermic reaction C6H12<=C6H6+3H2 at 1 atmosphere goes to near completion at approximately 972 R or 512° F., there appears no reason the C6H12<=C6H6+3H2 exothermic reaction cannot drive the (N2O4=>2NO2) endothermic reaction.

The analytical operation to follow will assume a positive displacement piston-and-cylinder engine using the reversible C6H12<=>C6H6+3H2 reaction with a valved cell for introducing the product.

Operation—Third Embodiment

Table 3 below indicates the essential points in a third embodiment of a LT B/E-L heat engine cycle, represented by letters shown in FIG. 3, FIG. 4, and FIG. 5. For purposes of illustration of this embodiment, the environment this LT B/E-L heat engine cycle embodiment is presumed to operate in is a vacuum with a potential heat sink capability of approximately 150 K, such as may be found within our Moon's PSRs:

Table 3
A—A gaseous reactant/reactant mix at approximately 0.11 psi and approximately 972 R is passed through an endothermic catalytic reaction chamber where it undergoes a partial (C6H12=>C6H6+3H2 plus remnant C6H12) isobaric and isothermal catalytically-induced endothermic expansion and conversion to a gaseous product mix using source heat at approximately 972 R.
(B)—As shown with the dashed lines in FIG. 3, said gaseous product mix at approximately 0.11 psi and approximately 972 R exhausts directly into an expander. Heat exchanger #1 and heat exchanger #2 are bypassed. Assuming a positive displacement piston-and-cylinder expander, expansion begins with an isobaric expansion and then completes with an isentropic/adiabatic expansion.

D—Isobaric expansion completes, isentropic expansion begins.

(E)—As shown in FIG. 5, an isentropic expansion of approximately 1:7.3 ends at approximately 0.015 psi and approximately 675 R (375 K, 215° F.).

[F], G—As shown in FIG. 4, said gaseous product mix at approximately 0.015 psi and approximately 675 R is passed through an exothermic catalytic reaction chamber where it undergoes a partial ($C6H12<=C6H6+ 3H2+$ remnant C6H12) isobaric and isothermal catalytically-induced exothermic compression and conversion to a gaseous reactant mix, yielding back approximately 99% of the endothermically-stored heat in the product mix at approximately 675 R.

H—As shown in FIG. 5, simultaneously, the charge of said gaseous product mix at approximately 0.015 psi and approximately 675 R will exhaust through counterflow heat exchanger #3, which will ideally cool said gaseous product mix to approximately 540 R.

I—As shown in FIG. 5, simultaneously, the charge of said gaseous product mix at approximately 0.015 psi and approximately 540 R will exhaust through the cooler, where said gaseous reactant mix is subject to isobaric condensation at approximately 540 R into a non-gaseous reactant mix and a gaseous remnant product mix (H2), and where the gaseous remnant product mix is pumped back through the gaseous product return line into the product mix exiting the expander.

J—As shown in FIG. 5, said non-gaseous reactant mix is isothermally pump-pressurized to approximately 0.11 psi.

K—As shown in FIG. 5, said isothermally pressurized non-gaseous reactant mix at approximately 0.11 psi is preheated in heat exchanger #3 to a partial conversion to a gaseous reactant mix at approximately 0.11 psi.

L, M—As shown in FIG. 5, said combined non-gaseous and gaseous reactant mix at approximately 0.11 psi s converted into gaseous reactant mix at approximately 670 R within heat exchanger #4.

N—As shown in FIG. 5, said gaseous reactant mix at approximately 0.11 psi and approximately 670 R is heated by the primary heat source to approximately 972 R via heat exchanger #5. Note that heat exchanger #1 is bypassed.

And so on.

Following the flow process illustrated in FIG. 2, FIG. 3, and Table 1:

A. A reactant or gaseous reactant mix of primarily C6H12 with some remnant C6H6 at approximately 0.11 psi and approximately 972 R will be converted primarily to a gaseous product mix of C6H6+3H2 plus remnant C6H12 in an endothermic catalytic reactor at a temperature of approximately 972 R using source heat. Note that said source heat can be the heat of exothermic conversion from the B/E-L heat engine cycle described in the second embodiment above. Said gaseous product mix will undergo a chemo/thermodynamic molecular volumetric expansion of about 3.7 times the volume prior to endothermic dissociation.

(B). As shown with the dashed lines in FIG. 3, said gaseous product mix at approximately 0.11 psi and approximately 972 R exhausts directly into a positive displacement piston-and-cylinder expander, creating an initial isobaric expansion. This is as distinct from step B in the first embodiment, where the product first passes through cooling heat exchanger #1 prior to passing into the expander. The inference is that a low temperature, high expansion ratio expander is used, such as a positive displacement expander.

C. (Bypassed)

D. In a piston-and-cylinder positive displacement expander, just prior to TDC, the expander cylinder exhaust valve will be closed. Further travel to TDC will recompress remnant gas. Consequently, at TDC the expander inlet valve/transfer valve will be partially opened by said recompression of remnant gas. Isobaric expansion of said gaseous product mix will begin. Shortly after TDC, the expander inlet valve/transfer valve will be quickly closed, for example by solenoid action, having charged the expander cylinder with a quantity of gaseous product mix at approximately 0.11 psi and approximately 972 R and thus at constant pressure and temperature.

(E). With the near-instantaneous closure of the expander inlet valve/transfer valve, an isentropic expansion of the gaseous product mix will then occur as the piston travels to BDC, dropping the gas to approximately 0.015 psi and approximately 675 R. Following isentropic expansion, the expander exhaust valve will be opened and the expansion piston will exhaust said gaseous product mix at constant pressure and temperature.

[F]. As shown with the dashed lines in FIG. 3 and in FIG. 5, isobaric exhaust and cooling of said gaseous product mix at approximately 0.015 psi and approximately 675 R would normally occur via heat exchanger #1. However, since said gaseous product mix temperature exiting the expander is approximately equal to the exothermic catalytic reactor temperature, both heat exchanger #1 and radiant heat exchanger #2 are not required, and said gaseous product mix is therefore exhausted directly from said expander into said exothermic catalytic reactor.

G. Simultaneously, said gaseous product mix at approximately 0.015 psi and approximately 675 R will exhaust through the exothermic catalytic reactor, converting said gaseous product mix at constant pressure and temperature to a gaseous reactant mix of primarily C6H12 plus remnant C6H6 and H2 while simultaneously undergoing a molecular compression to about 1/3.7th of the prior molal volume.

H. Simultaneously, said gaseous product mix at approximately 0.015 psi and approximately 675 R will exhaust into counterflow heat exchanger #3, which will ideally cool said gaseous product mix to approximately 540 R.

I. Simultaneously, said cooled gaseous reactant mix at approximately 0.015 psi and approximately 540 R will exhaust through a cooler, condensing into a non-gaseous reactant mix (C6H12 and remnant C6H6) and remnant gaseous product (H2). The non-gaseous reactant mix will be sent to storage. Any remnant gaseous product entrained in the stream leaving counterflow heat exchanger #3 and/or the cooler will be separated from the liquid and be pumped at low pressure back to the exhaust stream leaving the expander via a gaseous product return line (see FIG. 3), where it will be run back through the exothermic reactor.

J. The separated non-gaseous reactant mix will then be removed from storage and isothermally pumped-pressurized to approximately 0.11 psi.

K. The approximately 0.11 psi non-gaseous reactant mix will then be warmed by the approximately 0.015 psi and approximately 675 R gaseous reactant mix passing through counterflow heat exchanger #3 and thus be partially converted into a gaseous reactant mix.

L. The approximately 0.11 psi partially non-gaseous reactant mix will then be used to further cool the exothermic reactor in radiant heat exchanger #4, simultaneously converted any remaining non-gaseous reactant mix into a gaseous reactant mix at a temperature of approximately 675 R.

[M], N. The approximately 0.11 psi gaseous reactant mix at approximately 675 R will then use heat source radiant heat exchanger #5 to reach the required maximum temperature (approximately 1,710 R) just prior to being fed to the endothermic reactor. Note that heat exchanger #1 will be bypassed. Also note that the heat source may be otherwise-waste exothermic heat from the Second Embodiment B/E-L heat engine described above.

And thus back to the initial state.

Description—Fourth Embodiment

In this fourth embodiment, a B/E-L cycle such as is disclosed in the Second Embodiment and the schematic illustrated in FIG. 2 and FIG. 3 will be described as an example of the usefulness for VSR devices in B/E-L heat engine cycles. The example VSR will use two synchronized regenerator cores, as shown in FIG. In FIG. 6, core #1 is defined as on the left and core #2 is defined as on the right. The VSR is so arranged that one core is "storing" thermal energy while the other core is simultaneously "giving up" previously stored thermal energy. In this particular design, the valved regenerator is arranged to open or close all eight valves, ideally simultaneously and instantaneously. The valves are arranged in "sets". When the first set is open, the second set is closed, and vice-versa. A set is comprised of the "hot side" valves (set #1) for both regenerator cores and the "cold side" valves (set #2) for both regenerator cores. A timing mechanism such as a geneva mechanism (not shown) arranges to quickly shift sets at an appropriate moment, thus completely opening or completely closing all valves. Finally, a cooler (not shown) may be utilized following the passage of the product/product mix through the VSR, and likewise a heater (shown in FIG. 3 as a preheater or heat exchanger #5) may be utilized following the passage of the reactant/reactant mix through the VSR.

A High Temperature VSR (HT VSR), shown in FIG. 3 as heat exchanger #1, may be used between the endothermic reactor and the expander, just prior to where the primarily C6H12 reactant mix enters the endothermic reactor and just following where the primarily C6H6 and 3H2 product mix exits the endothermic reactor. That is, HT VSR core #1 will store heat from the the approximately 75 psi C6H6+3H2 product mix flowing out of the endothermic reactor while HT VSR core #2 gives up its stored heat to the the approximately 75 psi C6H12 reactant mix flowing towards the endothermic reactor. This switching cycle may be made to occur once per positive displacement heat engine cycle, for example just prior to the expander intake stroke, or it may be made to cycle in such a way as to deliver and/or receive an uninterrupted flow at constant pressure to and from said endothermic reactor, as will be shown. In either case, at the end of each switching cycle, the cores will change places, and HT VSR core #2 will store heat while HT VSR core #1 gives up its stored heat. And so on, cyclically.

It should be noted that, in FIG. 2, the product mix exiting the endothermic reactor and the reactant mix entering the reactor are assumed to pass through a recuperator rather than a regenerator. As a result, a less efficient mechanism is assumed for thermal regeneration. Use of a VSR will, perhaps dramatically, increase the amount of thermal regeneration. As a result, the heating of the reactant mix will move to some degree from the estimated temperature at point M towards the endothermic reactor temperature or point N. Likewise, the cooling of the product mix will move to some degree from the estimated temperature at point C, D towards the the temperature of the exothermic reactor at point L. Among other things, that will clearly impact the amount of source heat that will need to be added, increasing theoretical thermal efficiency. It is for that reason this Fourth Embodiment is being proposed.

Operation—Fourth Embodiment

Reference is made herein to Table 1 above as indicating the essential points in one embodiment of a B/E-L, represented by letters shown in FIG. 2 and FIG. 3. In this Fourth Embodiment, heat exchanger #1 will be shown to use a HT VSR:

A. A reactant or gaseous reactant mix of primarily C6H12 with some remnant C6H6 at approximately 75 psi and approximately 1,710 R will be converted primarily to a gaseous product mix C6H6+3H2 plus remnant C6H12 in an endothermic catalytic reactor at a temperature of approximately 1,710 R using source heat (concentrated solar energy may be used, as shown in FIG. 3). Said gaseous product mix will undergo a chemo/thermodynamic molecular volumetric expansion of about 3.7 times the volume prior to endothermic dissociation.

B. Said gaseous product mix exhausts from said catalytic reaction chamber at approximately 75 psi and approximately 1,710 R.

Figure 6:
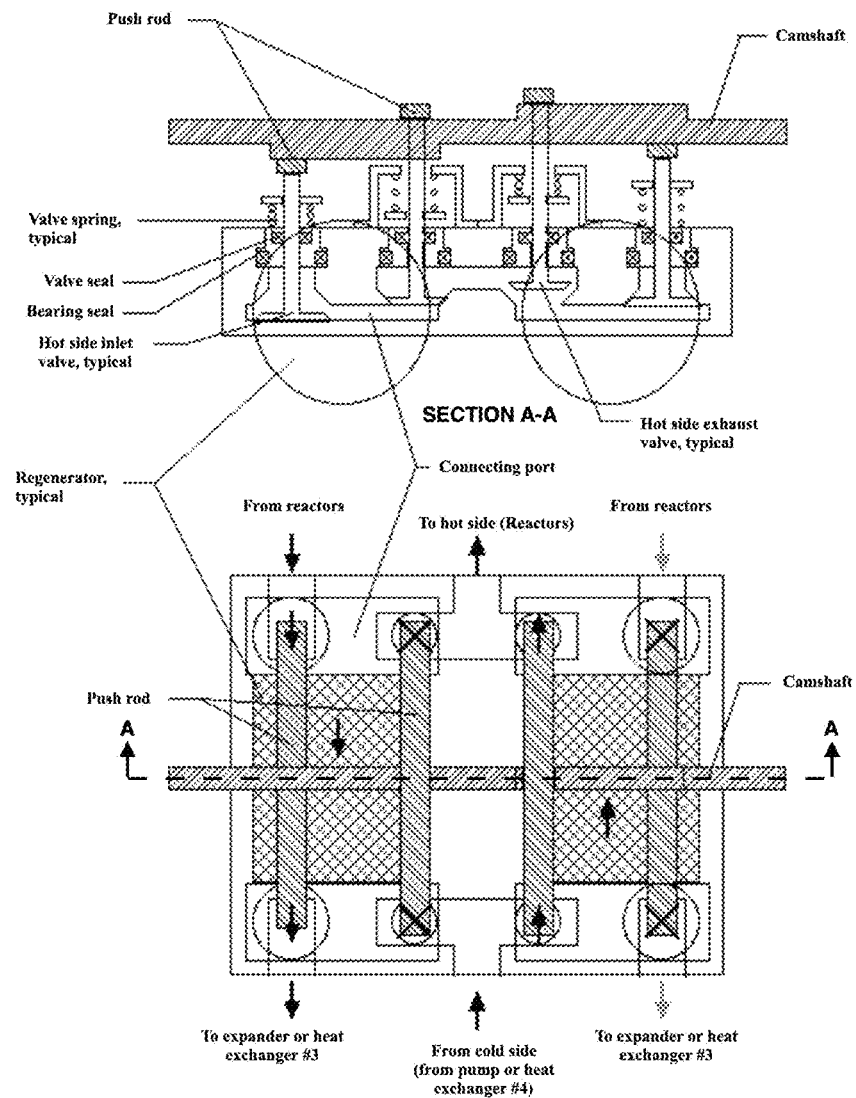
FIG. 6 illustrates one possible embodiment of a ducted/valved regenerator suitable for use with the cycles shown in FIGS. 2, 3, 4, and 5.

C. Said gaseous product mix is passed at constant pressure through heat exchanger #1, which is shown in FIG. 6 as the HT VSR left side regenerator core, will exchange heat from a previous flow of cool gaseous reactant mix (at approximately 972 R), dropping said gaseous product mix to approximately 1,230 R and exhausting said product mix into a positive displacement expander cylinder at approximately 75 psi. When or shortly before the left side regenerator core exhaust begins to go up in temperature, the HT VSR valving will shift the flow such that said gaseous product mix will flow instead through the HT VSR right side regenerator core. This switching will continue cyclically back and forth as long as flow continues.

D. In the piston-and-cylinder positive displacement expander, just prior to TDC, the expander cylinder exhaust valve will be closed. Further travel to TDC will automatically recompress remnant gas. Consequently, at TDC the expander inlet valve/transfer valve will be partially opened by said recompression of remnant gas. A force such as a stainless steel spring then completely opens the transfer valve. Isobaric expansion of said gaseous product mix will begin. Shortly after TDC, the expander inlet valve/transfer valve will be quickly closed, for example by solenoid action, having charged the expander cylinder with a set quantity of gaseous product mix at approximately 75 psi and approximately 1,180 R and thus at constant pressure and temperature.

E. With the near-instantaneous closure of the expander inlet valve/transfer valve, an isentropic expansion of the gaseous product mix will then occur as the piston travels to BDC, dropping the gas to approximately 15 psi and approximately 750 R. Following isentropic expansion, the expander exhaust valve will be opened and the expansion piston will exhaust said gaseous product mix at constant pressure and temperature (approximately 15 psi and approximately 750 R) into radiant heat exchanger #2.

F. The gaseous product mix will then receive heat from and partially cool a nearby exothermic catalytic reactor, raising said gaseous product mix to approximately 972 R.

G. Simultaneously, said gaseous product mix at approximately 15 psi and approximately 972 R will exhaust through the exothermic catalytic reactor, converting said gaseous product mix at constant pressure and temperature to a gaseous reactant mix of primarily C6H12 plus remnant C6H6 and H2 while simultaneously undergoing a molecular compression to about 1/3.7th of the prior molal volume.

H. Simultaneously, said gaseous reactant mix at approximately 15 psi and approximately 972 R will exhaust through counterflow heat exchanger #3, cooling it to approximately 640 R.

I. Simultaneously, said cooled gaseous reactant mix will exhaust through a cooler, dropping to less than 640 R and condensing into a non-gaseous reactant mix (C6H12 and remnant C6H6) and remnant gaseous product (H2). The non-gaseous reactant mix will be sent to storage. Any remnant gaseous product entrained in the stream leaving counterflow heat exchanger #3 and/or the cooler will be separated from the liquid and be pumped at low pressure back to the exhaust stream leaving the expander via a gaseous product return line (see FIG. 3), where it will be run back through the exothermic reactor.

J. The separated non-gaseous reactant mix will then be removed from storage and isothermally pumped-pressurized to approximately 75 psi.

K. The approximately 75 psi non-gaseous reactant mix will then be warmed by the approximately 15 psi gaseous reactant mix passing through counterflow heat exchanger #3 and be partially converted into a partially non-gaseous reactant mix.

L. The approximately 75 psi partially non-gaseous reactant mix will then be used to further cool the exothermic reactor in radiant heat exchanger #4, simultaneously converted any remaining non-gaseous reactant mix into a gaseous reactant mix at a temperature of approximately 972 R.

M. Said gaseous reactant mix is preheated via heat exchanger #1, which is shown in FIG. 6 as the HT VSR right side regenerator core, raising said gaseous product mix towards 1,710 R and exhausting said product mix into heat exchanger at approximately 75 psi. When or shortly before the left side regenerator core exhaust begins to go down in temperature, the HT VSR valving will shift the flow such that said gaseous product mix will flow instead through the HT VSR left side regenerator core. This switching will continue cyclically as long as flow continues.

N. Said gaseous reactant mix is heated by the primary heat source to approximately 1,710 R via heat exchanger #5. And so on.

Conclusion, Ramifications, and Scope

Other reversible thermochemical cycles are possible, and therefore the reversible C6H12<=>C6H6+3H2 cycle is used herein as a general example.

While pressure and temperature alone can define endothermic and exothermic processes of heat absorption and rejection in reversible thermochemical cycles, catalysts are essential in helping create near-instantaneous thermochemical conversions for a given amount of conversion at a given pressure and a given temperature.

All calculations herein should be considered only useful as means of generally illustrating the larger findings herein.

What is claimed is:

1. A method for performing a closed thermochemical and thermodynamic (chemo/thermodynamic) work-producing cycle comprising a first half-cycle and a second half-cycle, wherein said first half-cycle comprises:
   a. removing from a first storage system a non-gaseous first reactant or reactant mix;
   b. increasing the pressure of said non-gaseous first reactant or reactant mix to a set pressure;
   c. preheating, with exothermic heat from an earlier half-cycle, said pressurized non-gaseous first reactant or reactant mix to its point of conversion to a vapor;
   d. vaporizing, with exothermic heat from said half-cycle, said preheated and pressurized non-gaseous first reactant or reactant mix to make a pressurized vaporous first reactant or reactant mix;
   e. preheating, with exothermic heat from said half-cycle, said pressurized and vaporous first reactant or reactant mix to a higher temperature;
   f. preheating, with a primary heat source, said pressurized and vaporous first reactant or reactant mix to the temperature of an endothermic thermochemical reaction chamber;
   g. passing said preheated, pressurized, and vaporous first reactant or reactant mix into said endothermic thermochemical reaction chamber;
   h. stimulating, with said primary heat source, said preheated, pressurized, and vaporized first reactant or reactant mix within said endothermic thermochemical reaction chamber to cause said preheated, pressurized, and vaporized first reactant or reactant mix to chemically absorb heat during a first constant temperature and constant pressure process, thus changing said preheated, pressurized, and vaporized first reactant or reactant mix into a gaseous first product or product mix;
   i. expanding, with a first work-producing expander, said gaseous first product or product mix to lower the pressure and temperature of said gaseous first product or product mix and to produce work;
   j. cooling, with a first cooler, said expanded gaseous first product or product mix to the point where said expanded gaseous first product or product mix separates into a gaseous second product or product mix and a non-gaseous product or product mix;
   k. storing, in a second storage system, said non-gaseous product or product mix;
   l. storing, in a third storage system, said gaseous second product or product mix, and wherein said second half-cycle comprises:

m. removing from said second storage system a portion of said stored non-gaseous product or product mix;

n. increasing the pressure of said portion of non-gaseous product or product mix to a set pressure;

o. Preheating, with exothermic heat from an earlier cycle or half-cycle, said portion of pressurized non-gaseous product or product mix to its point of conversion to a vapor;

p. vaporizing, with exothermic heat from an earlier cycle or half-cycle, said portion of preheated and pressurized non-gaseous product or product mix to make a pressurized and vaporous product or product mix;

q. preheating, with exothermic heat from an earlier cycle or half-cycle, said pressurized and vaporous product or product mix to the temperature of an exothermic thermochemical reaction chamber;

r. removing from said third storage system a portion of said gaseous second product or product mix;

s. increasing the pressure of said portion of gaseous second product or product mix to a set pressure;

t. preheating, with exothermic heat from an earlier cycle or half-cycle, said portion of pressurized gaseous second product or product mix to the temperature of said exothermic thermochemical reaction chamber;

u. passing said pressurized, vaporous, and preheated product or product mix and said portion of pressurized and preheated gaseous second product or product mix into said exothermic thermochemical reaction chamber, thereby creating a combined pressurized and preheated third product or product mix;

v. removing heat, with a second cooler, from said combined pressurized and preheated third product or product mix within said exothermic thermochemical reaction chamber to cause said combined pressurized and preheated third product or product mix to chemically produce heat during a second constant temperature and constant pressure process, thus changing a quantity of said combined pressurized and preheated third product or product mix into a combined second reactant or reactant mix/fourth product mix;

w. cooling, with a third cooler, said second reactant or reactant mix/fourth product mix to the point where said cooled second reactant or reactant mix/fourth product mix separates into a non-gaseous second reactant or reactant mix portion and a vaporous and/or gaseous fourth product or product mix portion;

x. pumping said vaporous and/or gaseous fourth product or product mix portion back to the beginning of process (s), and injecting said vaporous and/or gaseous fourth product or product mix portion into said portion of gaseous second product or product mix; and y. storing, in said first storage system, said non-gaseous second reactant or reactant mix portion.

2. The method of claim 1, further comprising:

separating a portion of said expanded gaseous first product or product mix exiting said first work-producing expander;

heating or cooling said portion of expanded gaseous first product or product mix to the temperature of a second exothermic reactor;

converting said portion of expanded gaseous first product or product mix to a third reactant or reactant mix which, via an exothermic reaction in the second exothermic reactor, chemically matches said first reactant or reactant mix;

utilizing the heat released by said exothermic reaction in said first half-cycle to (a) convert said pressurized non-gaseous first reactant or reactant mix into said pressurized vaporous and/or gaseous reactant or reactant mix and (b) raise the temperature of said pressurized vaporous and/or gaseous reactant or reactant mix to the temperature of said endothermic thermochemical reaction chamber reactor; and either:

storing said third reactant or reactant mix in a third storage system and then storing said third reactant or reactant mix for a set time and/or moving said third reactant or reactant mix over a set distance to a place where said third reactant or reactant mix is passed once more through said first half-cycle, or storing said third reactant or reactant mix in said first storage system.

3. The method of claim 1, further comprising using a portion or all of exothermic heat released by said chemo/thermodynamic work-producing cycle to provide part or all of a primary heat source for a second, lower-temperature chemo/thermodynamic work-producing cycle.

4. The method of claim 1, wherein part or all of the primary heat source comes from a portion or all of heat released by a primary, higher-temperature chemo/thermodynamic work-producing cycle.

5. The method of claim 1, wherein a valved and/or ducted regenerator is used as a means of heat exchange.

6. The method of claim 5, wherein said valved and/or ducted regenerator comprises at least two synchronized regenerator cores receiving counter-flowing fluids, and wherein said at least two synchronized regenerator cores are so arranged that a first core of the at least two synchronized regenerator cores is storing thermal energy from a first counter-flowing fluid while a second core of the at least two synchronized regenerator cores is simultaneously giving up previously stored thermal energy to a second counter-flowing fluid, said first and second counter-flowing fluids being either gaseous or non-gaseous in part or in total.

7. The method of claim 6, wherein said first and second cores are switched by the use of valves that alternately connect said first and second cores to said first and second counter-flowing fluids and disconnect said first and second cores from said first and second counter-flowing fluids.

8. The method of claim 6, wherein said first and second cores are switched by the use of rotating ports that alternately connect said first and second cores to said first and second counter-flowing fluids and disconnect said first and second cores from said first and second counter-flowing fluids.

9. The method of claim 6, wherein said first and second cores are switched by the rotation of said first and second cores between ports that alternately connect said first and second cores to said first and second counter-flowing fluids and disconnect said first and second cores from said first and second counter-flowing fluids.

10. A method for performing a closed thermochemical and thermodynamic (chemo/thermodynamic) work-producing cycle comprising a first work-producing half-cycle and a second heat-producing half-cycle, wherein, during said first work-producing half-cycle:

a first reactant or reactant mix is stored in a first storage system in non-gaseous form;

said non-gaseous first reactant or reactant mix is pressurized;

heat is added to (a) convert said pressurized non-gaseous first reactant or reactant mix into a pressurized vaporous and/or gaseous first reactant or reactant mix and (b) raise the temperature of said pressurized vaporous and/or gaseous first reactant or reactant mix to the temperature of an endothermic reactor;

said first reactant or reactant mix is made to flow continuously and linearly through said first work-producing half-cycle until said first reactant or reactant mix is partially or completely consumed in an endothermic reaction fueled by a primary heat source;

said endothermic reaction increases the mole count by converting said first reactant or reactant mix to a product or product mix;

said product or product mix is expanded in an expander; and a quantity of said expanded product or product mix is converted at least in part to a non-gaseous form and stored in a second storage system and stored for a set time and/or moved a set distance to a place where said quantity of product or product mix is passed through said second heat-producing half-cycle, and wherein, during said second heat-producing half-cycle:

a quantity of said product or product mix in the non-gaseous form is pressurized;

heat is added to (a) convert said pressurized non-gaseous product or product mix into a pressurized vaporous and/or gaseous product or product mix and (b) raise the temperature of said pressurized vaporous and/or gaseous product or product mix to the temperature of an exothermic reactor;

said product or product mix is made to flow continuously and linearly through said second heat-producing half-cycle until said product or product mix is partially or completely consumed in an exothermic reaction that decreases the mole count by converting said product or product mix to a second reactant or reactant mix that chemically matches said first reactant or reactant mix;

the heat released by said exothermic reaction is utilized; and said second reactant or reactant mix is either:
    stored in a third storage system and stored for a set time and/or moved over a set distance to a place where said second reactant or reactant mix is passed once more through said first work-producing half-cycle, or
    stored in said first storage system.

11. The method of claim 10, further comprising:

separating a portion of said product or product mix exiting said expander;

heating or cooling said portion of product or product mix to the temperature of a second exothermic reactor;

converting, via a second exothermic reaction in the second exothermic reactor, said portion of product or product mix to a third reactant or reactant mix that chemically matches said first reactant or reactant mix;

utilizing the heat released by said second exothermic reaction in said first work-producing half-cycle to (a) convert said pressurized non-gaseous first reactant or reactant mix into said pressurized vaporous and/or gaseous reactant or reactant mix and (b) raise the temperature of said pressurized vaporous and/or gaseous reactant or reactant mix to the temperature of said endothermic reactor; and either:
    storing said third reactant or reactant mix in a third storage system and then storing said third reactant or reactant mix for a set time and/or moving said third reactant or reactant mix over a set distance to a place where said third reactant or reactant mix is passed once more through said first work-producing half-cycle, or
    storing said third reactant or reactant mix in said first storage system.

12. The method of claim 10, further comprising using a portion or all of exothermic heat released by said chemo/thermodynamic work-producing cycle to provide part or all of a primary heat source for a second, lower-temperature chemo/thermodynamic work-producing cycle.

13. The method of claim 10, wherein part or all of the primary heat source comes from a portion or all of heat released by a primary, higher-temperature chemo/thermodynamic work-producing cycle.

14. The method of claim 10, wherein a valved and/or ducted regenerator is used as a means of heat exchange.

15. The method of claim 14, wherein said valved and/or ducted regenerator comprises at least two synchronized regenerator cores receiving counter-flowing fluids, and wherein said at least two synchronized regenerator cores are so arranged that a first core of the at least two synchronized regenerator cores is storing thermal energy from a first counter-flowing fluid while a second core of the at least two synchronized regenerator cores is simultaneously giving up previously stored thermal energy to a second counter-flowing fluid, said first and second counter-flowing fluids being either gaseous or non-gaseous in part or in total.

16. The method of claim 15, wherein said first and second cores are switched by the use of valves that alternately connect said first and second cores to said first and second counter-flowing fluids and disconnect said first and second cores from said first and second counter-flowing fluids.

17. The method of claim 15, wherein said first and second cores are switched by the use of rotating ports that alternately connect said first and second cores to said first and second counter-flowing fluids and disconnect said first and second cores from said first and second counter-flowing fluids.

18. The method of claim 15, wherein said first and second cores are switched by the rotation of said first and second cores between ports that alternately connect said first and second cores to said first and second counter-flowing fluids and disconnect said first and second cores from said first and second counter-flowing fluids.

* * * * *